(12) United States Patent
Liang et al.

(10) Patent No.: US 9,807,749 B2
(45) Date of Patent: Oct. 31, 2017

(54) COMMUNICATION SYSTEM

(71) Applicant: NEC Corporation, Tokyo (JP)

(72) Inventors: Caroline Liang, London (GB); Yassin Aden Awad, London (GB); Robert Arnott, London (GB)

(73) Assignee: NEC Corporation, Tokyo (JP)

(*) Notice: Subject to any disclaimer, the term of this patent is extended or adjusted under 35 U.S.C. 154(b) by 165 days.

(21) Appl. No.: 14/399,659

(22) PCT Filed: Apr. 24, 2013

(86) PCT No.: PCT/JP2013/062744
§ 371 (c)(1),
(2) Date: Nov. 7, 2014

(87) PCT Pub. No.: WO2013/168664
PCT Pub. Date: Nov. 14, 2013

(65) Prior Publication Data
US 2015/0117240 A1    Apr. 30, 2015

(30) Foreign Application Priority Data

May 10, 2012 (GB) .................................. 1208236.8

(51) Int. Cl.
*H04W 72/04* (2009.01)
*H04W 72/08* (2009.01)
(Continued)

(52) U.S. Cl.
CPC ......... *H04W 72/042* (2013.01); *H04L 1/0025* (2013.01); *H04L 1/0026* (2013.01);
(Continued)

(58) Field of Classification Search
None
See application file for complete search history.

(56) References Cited

U.S. PATENT DOCUMENTS

2008/0165696 A1   7/2008 Koo
2010/0150090 A1   6/2010 Park et al.
(Continued)

FOREIGN PATENT DOCUMENTS

CN    101730985 A    6/2010
CN    101895936 A    11/2010
(Continued)

OTHER PUBLICATIONS

International Search Report corresonding to PCT/JP2013/062744, dated Dec. 9, 2013, 6 pages.
(Continued)

*Primary Examiner* — Robert C Scheibel
(74) *Attorney, Agent, or Firm* — Wilmer Cutler Pickering Hale and Dorr LLP

(57) ABSTRACT

A communication system is presented in which a communication device communicates, in at least one communication cell operated by communication apparatus, using a plurality of subframes, wherein each subframe comprises a plurality of communication resources. A respective measure of communication quality associated with each of the communication resources is obtained and a search space, comprising a set of the communication resources, is defined based on the measures of communication quality. The mobile device searches for control information in the defined search space.

20 Claims, 11 Drawing Sheets

(51) Int. Cl.
*H04L 5/00* (2006.01)
*H04L 1/00* (2006.01)
*H04W 24/08* (2009.01)

(52) U.S. Cl.
CPC ............ *H04L 5/006* (2013.01); *H04L 5/0053* (2013.01); *H04L 5/0057* (2013.01); *H04L 5/0069* (2013.01); *H04W 24/08* (2013.01); *H04W 72/085* (2013.01); *H04L 5/0007* (2013.01)

(56) References Cited

U.S. PATENT DOCUMENTS

| | | | | |
|---|---|---|---|---|
| 2010/0157922 | A1* | 6/2010 | Kim | H04L 5/0094 370/329 |
| 2011/0243015 | A1 | 10/2011 | Lim et al. | |
| 2011/0286413 | A1* | 11/2011 | Nishio | H04L 5/0053 370/329 |
| 2013/0107816 | A1* | 5/2013 | Iraji | H04W 72/042 370/329 |
| 2013/0107861 | A1* | 5/2013 | Cheng | H04W 72/042 370/331 |
| 2014/0328302 | A1* | 11/2014 | Park | H04L 5/0037 370/329 |

FOREIGN PATENT DOCUMENTS

| | | |
|---|---|---|
| CN | 102149208 A | 8/2011 |
| EP | 2378824 A1 | 10/2011 |
| EP | 2385735 | 11/2011 |
| EP | 2410804 | 1/2012 |
| EP | 2434820 | 3/2012 |
| WO | WO-95/34957 | 12/1995 |
| WO | WO-2008/082270 | 7/2008 |
| WO | WO-2011/126234 | 10/2011 |

OTHER PUBLICATIONS

3GPP TSG RAN WG1 Meeting #66bis, Zhuhai, China, Oct. 10-14, 2011, RAN1 Chairman's Notes, RAN1#66bis, 34 pages.

3GPP TS 36.213 standard (V10.5.0), Mar. 2012, 3rd Generation Partnership Project; Techincal Specification Group Radio Access Network; Evolved Universal Terrestrial Radio Access (E-UTRA); Physical Layer Procedures (Release 10), 125 pages.

International Search Report corresponding to GB1208236.8, dated Sep. 7, 2012, 1 page.

CATT, "Design of E-PDCCH search space," 3GPP TSG RAN WG1 Meeting #68, R1-120111, Dresden, Germany, 4 pages (Feb. 6-10, 2012).

NEC Group, "Localised E-PDCCH resource configuration and fallback operation," TSG-RAN WG1 #69, R1-122606, Prague, Czech Republic, 4 pages (May 21-25, 2012).

European Communication Pursuant to Article 94(3) EPC issued in corresponding European Patent Application No. 13722132.1, dated Nov. 28, 2016, 4 pages.

Chinese Office Action dated by the State Intellectual Property Office of The People's Republic of China for Chinese Application No. 201380024287.5 dated Jun. 9, 2017 (22 pages).

Huawei, HiSilicon, "Search space design for ePDCCH," 3GPP TSG RAN WG1 Meeting #68, R1-120048, Dresden, Germany, Feb. 6-10, 2012 (5 pages).

* cited by examiner

Figure 5

COMMUNICATION SYSTEM

CROSS-REFERENCE TO RELATED APPLICATIONS

This application is a national stage application of International Application No. PCT/JP2013/062744 entitled "COMMUNICATION SYSTEM WITH ADAPTIVE CONTROL CHANNEL RESOURCE ALLOCATION" filed on Apr. 24, 2013, which claims priority to United Kingdom Patent Application No. 1208236.8 filed on May 10, 2012, the disclosures of which are hereby incorporated by reference in their entirety.

TECHNICAL FIELD

The present invention relates to mobile communications devices and networks, particularly but not exclusively those operating according to the 3$^{rd}$ Generation Partnership Project (3GPP) standards or equivalents or derivatives thereof. The invention has particular although not exclusive relevance to the Long Term Evolution (LTE) of UTRAN (called Evolved Universal Terrestrial Radio Access Network (E-UTRAN)).

BACKGROUND ART

In a mobile (cellular) communications network, mobile devices (also known as User Equipment (UE) or mobile terminals, such as mobile telephones) communicate with remote servers or with other mobile devices via base stations. In their communication with each other, mobile devices and base stations use licensed radio frequencies, which are typically divided into frequency bands and/or time blocks. Depending on various criteria (such as the amount of data to be transmitted, radio technologies supported by the mobile device, expected quality of service, subscription settings, etc.), each base station is responsible for controlling the transmission timings, frequencies, transmission powers, modulations, etc. employed by the mobile devices attached to the base station. The scheduling decision can be modified every transmission time interval, e.g. as frequently as 1 ms. In order to minimise disruption to the service and to maximise utilisation of the available bandwidth, the base stations continuously adjust their own transmission power and also that of the mobile devices. Base stations also assign frequency bands and/or time slots to mobile devices, and also select and enforce the appropriate transmission technology to be used between the base stations and the attached mobile devices. By doing so, base stations also reduce or eliminate any harmful interference caused by mobile devices to each other or to the base stations.

In order to be able to communicate via the base stations, mobile devices need to monitor the control channels operated by the base stations. One of these control channels, the so-called Physical Downlink Control Channel (PDCCH) carries the scheduling assignments and other control information. The PDCCH serves a variety of purposes. Primarily, it is used to convey the scheduling decisions to individual mobile devices, i.e. scheduling assignments for uplink and downlink communication.

The information carried on the PDCCH is referred to as downlink control information (DCI). The format of the DCI can vary depending on the purpose of the control message.

An additional Physical Control Format Indicator Channel (PCFICH) is transmitted by the base station to indicate the size of the PDCCH (e.g. the number of orthogonal frequency-division multiplexing (OFDM) symbols occupied by the PDCCH). Using OFDMA, the mobile devices are allocated blocks comprising a specific number of subcarriers for a predetermined amount of time. These are referred to as physical resource blocks (PRBs) in the LTE specifications. PRBs thus have both a time and a frequency dimension. One PRB consists of 12 consecutive subcarriers for one slot (0.5 ms) in duration. The PRB is the smallest element of resource allocation assigned by the base station. LTE, radio frames are divided into 10 subframes, each subframe being 1.0 ms long. Each subframe is further divided into two slots, each of 0.5 ms in duration. Slots consist of either 6 or 7 ODFM symbols, depending on whether the normal or extended cyclic prefix is employed.

Physical control channels, such as the PDCCH, are transmitted on an aggregation of one or several consecutive Control Channel Elements (CCEs), where a control channel element corresponds to nine Resource Element Groups (REGs). Each REG has four Resource Elements (REs).

When a mobile device is first switched on or when it arrives in an area served by a base station, it will look for the location of the control channels in the frequency band(s) used by that base station. For example, the mobile device needs to check all possible combinations of locations and formats of the PDCCH, and the DCI formats and act on those messages. Since the decoding of all possible combinations would require the mobile device to make many PDCCH decoding attempts, 3GPP defined an alternative approach for LTE, according to which, for each mobile device served by the base station, a limited set of CCE locations are set where a PDCCH may be placed. The set of CCE locations in which the mobile device may find its PDCCH can be considered as a 'search space', for example, as described in section 9.1.1 of the 3GPP TS 36.213 standard.

In LTE the search space is a different size for each PDCCH format. Moreover, separate dedicated and common search spaces are defined, where a dedicated search space is configured for each UE individually, while all mobile devices are informed of the extent of the common search space.

It has been decided, as part of the 3GPP standardisation process, that downlink operation for system bandwidths beyond 20 MHz will be based on the aggregation of a plurality of component carriers at different frequencies. Such carrier aggregation (CA) can be used to support operation in a system both with and without a contiguous spectrum (for example, a non-contiguous system may comprise component carriers at 800 MHz, 2 GHz, and 3.5 GHz). Whilst a legacy mobile device may only be able to communicate using a single, backward compatible, component carrier, a more advanced multi-carrier capable terminal would be able to simultaneously use the multiple component carriers.

Carrier aggregation can be particularly beneficial in a heterogeneous network (HetNet), even when the system bandwidth is contiguous, and does not exceed 20 MHz because multiple carriers enable interference management between different power class cells as well as open access and closed subscriber group (CSG) cells. Long-term resource partitioning can be carried out by exclusively dedicating carriers to a certain power class of cell (Macro/Pico/CSG).

3GPP have considered introducing a so-called Enhanced Physical Downlink Control Channel (ePDCCH) which supports Carrier Aggregation (CA), including new carrier types (also known as CA Enhancement), Coordinated Multiple Point Transmission/Reception (CoMP) and Downlink Multiple In Multiple Out (DL MIMO) technologies. Advantageously, the ePDCCH supports:
increased control channel capacity;
frequency-domain Inter-Cell Interference Control (ICIC);
improved spatial reuse of control channel resource;
beamforming and/or diversity;
new carrier type(s);
Multicast-Broadcast Single Frequency Network (MBSFN) subframes;
legacy User Equipment (UE) coexisting on the same carrier;
frequency-selective scheduling; and
mitigation of inter-cell interference.

DISCLOSURE OF THE INVENTION

The introduction of a new control channel (ePDCCH), however, presents the challenge of how and where to signal the control channel in associated radio frames and how to ensure that user equipment can efficiently locate and interpret the control signaling.

The present invention seeks to provide systems, devices and methods which at least partially address the above issues.

According to one aspect, the present invention provides a communication device for communicating with a plurality of further communication devices in a cellular communication system, the communication device comprising: means for communicating, in at least one communication cell operated by communication apparatus of the communication system, using a plurality of subframes, wherein each subframe comprises a plurality of communication resources; means for obtaining a respective measure of communication quality associated with each of the communication resources and for providing information identifying the measures of communication quality to the communication apparatus; means for identifying a set comprising a number of the communication resources in which to search for control information transmitted by the communication apparatus wherein the presence of communication resources in the set is based on the measures of communication quality; and means for searching for control information in the set of communication resources.

The identifying means may identify communication resources for inclusion in the set based on the measures of communication quality obtained by the obtaining means.

The communication device may receive, from the communication apparatus, information identifying the communication resources of the set after providing, to the communication apparatus, the information identifying a respective measure of communication quality associated with each of the communication resources; and wherein the identifying means is operable to identify the communication resources of the set based on the information identifying the communication resources of the set received from the communication apparatus.

The communication device may signal information identifying the communication resources of the set to the communication apparatus. The communication device may signal the information identifying the communication resources of the set to the communication apparatus as part of the information identifying the measures of communication quality.

In one possibility, the set of communication resources may comprise a first set; the device may further comprise means for identifying, based on a predetermined criteria, a second set comprising a number of the communication resources in which to search for control information transmitted by the communication apparatus in the event that control information for the communication device is not found in the first set of communication resources; and the searching means may be operable to search for control information in the second set of communication resources if control information for the communication device is not found in the first set of communication resources.

The identifying means may identify communication resources for inclusion in the set based on at least one of a cell identity associated with the at least one cell and a subframe number associated with at least one of the plurality of subframes. The identifying means may identify communication resources for inclusion in the set from a subset of the communications resources that are contiguous in frequency which subset may be selected based on the at east one of the cell identity and the subframe number. The identifying means may identify communication resources for inclusion in the set from a subset of the communications resources that are distributed in frequency which subset may be selected based on the at least one of the cell identity and the subframe number.

The set comprising a number of the communication resources in which to search for control information transmitted by the communication apparatus may comprise a search space.

The control information transmitted by the communication apparatus may be transmitted in a control channel (e.g. a physical downlink control channel (PDCCH) or enhanced physical downlink control channel (ePDCCH)) and the device may locate the control channel by searching in the set of communication resources.

The control channel may comprise at least one control channel element (CCE). The information identifying the measures of communication quality may comprise at least one carrier quality indication (CQI) report. The communication resources in which to search for control information may be arranged in the set in order of decreasing quality based on the measures of communication quality.

The device may comprise a mobile telephone.

According to another aspect, the present invention provides communication apparatus for communicating with a plurality of mobile communication devices in a cellular communication system, the communication apparatus comprising: means for operating at least one communication cell; means for communicating using a plurality of subframes with at least one mobile communication device within the at least one cell, wherein each subframe comprises a plurality of communication resources; means for receiving, from the at least one mobile communication device, information identifying a respective measure of communication quality associated with each of the communication resources; means for identifying a set comprising a number of the communication resources for use in potential transmission of control information for the at least one mobile communication device wherein the presence of communication resources in the set is based on the measures of communication quality; and means for transmitting control information for the at least one mobile communication device in at least a subset of the set of communication resources.

The identifying means may identify communication resources for inclusion in the set based on the information identifying a respective measure of communication quality associated with each of the communication resources received from the communication device.

The communication device may receive, from the communication device and separately to the information identifying a respective measure of communication quality associated with each of the communication resources, information identifying the communication resources of the set; and the identifying means may identify the communication resources of the set based on the information identifying the communication resources of the set received from the communication device.

The communication apparatus may signal information identifying the communication resources of the set to the communication apparatus.

The set of communication resources may comprise a first set. The apparatus may further comprise means for identifying a second set comprising a number of the communication resources for use in potential transmission of control information for the at least one mobile communication device based on a predetermined criteria in the event that the information identifying a respective measure of communication quality associated with each of the communication resources has not been successfully received and interpreted by the communication apparatus, and the transmitting means may transmit control information for the at least one mobile communication device in at least a subset of the second set of communication resources if the information identifying a respective measure of communication quality associated with each of the communication resources has not been successfully received and interpreted by the communication apparatus.

The apparatus may comprise a base station.

According to another aspect, the present invention provides a communication device for communicating with a plurality of further communication devices in a cellular communication system, the communication device comprising: means for communicating, in at least one communication cell operated by communication apparatus of the communication system, using a plurality of subframes, wherein each subframe comprises a plurality of communication resources; means for identifying, based on information transmitted to the communication apparatus, a first set comprising a number of the communication resources in which to search for control information transmitted by the communication apparatus; means for identifying, based on a predetermined criteria, a second set comprising a number of the communication resources in which to search for control information transmitted by the communication apparatus in the event that control information for the communication device is not found in the first set of communication resources; and means for searching for control information in the first set of communication resources and, if control information for the communication device is not found in the first set of communication resources, for searching for control information in the second set of communication resources.

According to another aspect, the present invention provides communication apparatus for communicating with a plurality of mobile communication devices in a cellular communication system, the communication apparatus comprising: means for operating at least one communication cell; means for communicating using a plurality of subframes with at least one mobile communication device within the at least one cell, wherein each subframe comprises a plurality of communication resources; means for identifying a first set comprising a number of the communication resources for use in potential transmission of control information for the at least one mobile communication device based on information received from the mobile communication device, in the event that the information from the mobile communication device has been successfully received and interpreted by the communication apparatus; means for identifying a second set comprising a number of the communication resources for use in potential transmission of control information for the at least one mobile communication device based on a predetermined criteria, in the event that the information from the mobile communication device has not been successfully received and interpreted by the communication apparatus; and means for transmitting control information for the at least one mobile communication device: in at least a subset of the first set of communication resources, in the event that the information from the mobile communication device has been successfully received and interpreted by the communication apparatus; and in at least a subset of the second set of communication resources, if the information from the mobile communication device has not been successfully received and interpreted by the communication apparatus.

According to another aspect, the present invention provides a communication device for communicating with a plurality of further communication devices in a cellular communication system, the communication device comprising: means for communicating, in at least one communication cell having an associated cell identity and operated by communication apparatus of the communication system, using a plurality of subframes, wherein each subframe comprises a plurality of communication resources and has an associated subframe number; means for identifying a set comprising a number of the communication resources in which to search for control information transmitted by the communication apparatus wherein the presence of communication resources in the set is based on at least one of the cell identity and the subframe number; and means for searching for control information in the set of communication resources.

According to another aspect, the present invention provides communication apparatus for communicating with a plurality of mobile communication devices in a cellular communication system, the communication apparatus comprising: means for operating at least one communication cell having a corresponding cell identity; means for communicating using a plurality of subframes with at least one mobile communication device within the at least one cell, wherein each subframe comprises a plurality of communication resources and has an associated subframe number; means for identifying a set comprising a number of the communication resources for use in potential transmission of control information for the at least one mobile communication device wherein the presence of communication resources in the set is based on at least one of the cell identity and the subframe number; and means for transmitting control information for the at least one mobile communication device in at least a subset of the set of communication resources.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with any other disclosed and/or illustrated features. In particular but without limitation the features of any of the claims dependent from a particular independent claim may be introduced into that independent claim in any combination or individually.

BRIEF DESCRIPTION OF DRAWINGS

Embodiments of the invention will now be described by way of example only with reference to the attached figures in which:

FIG. 5 shows an example of a fallback search space selection mechanism in the telecommunication system of FIG. 1;

MODE(S) FOR CARRYING OUT THE INVENTION

Overview

Figure 1:
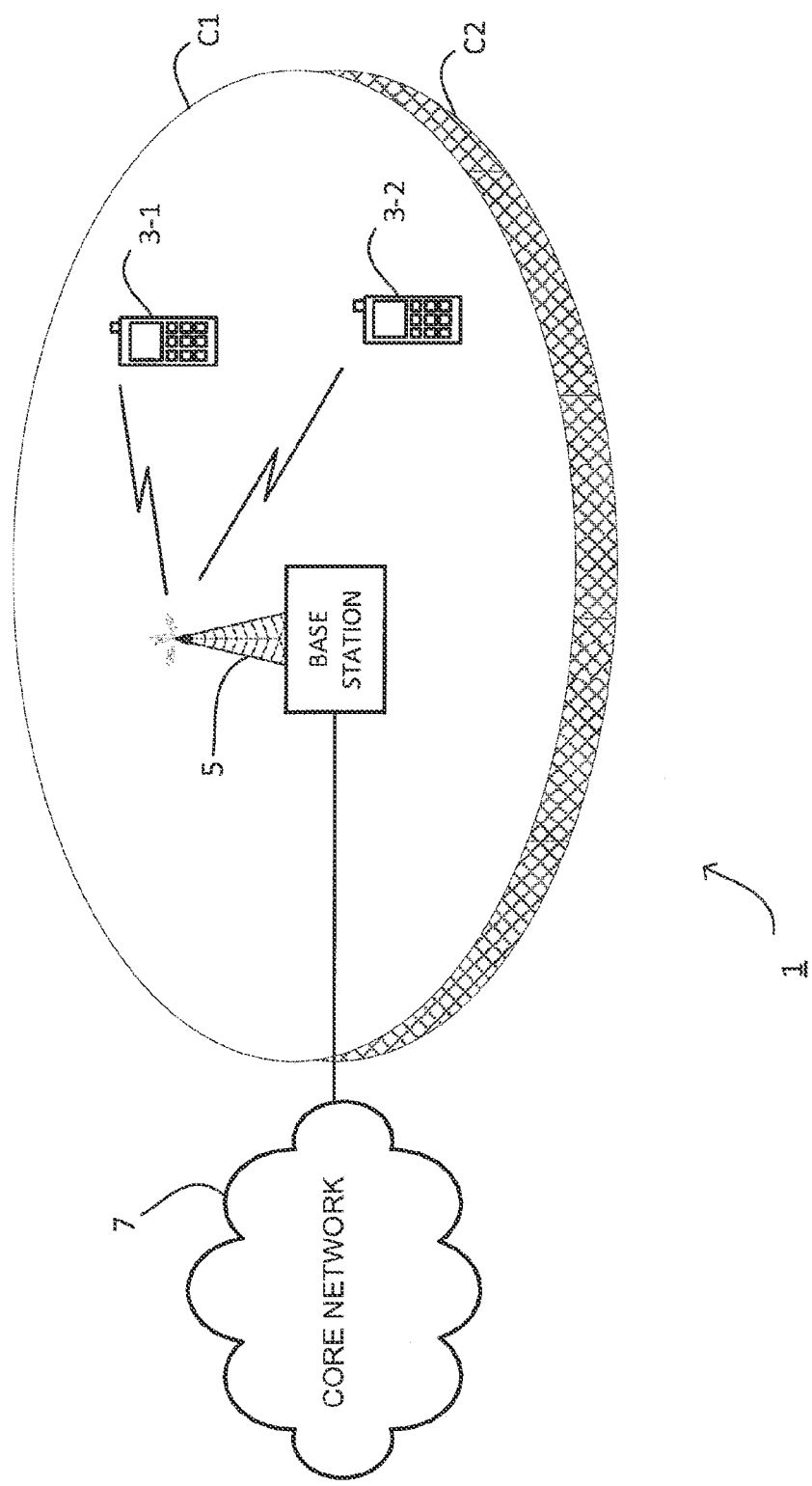
FIG. 1 schematically illustrates a telecommunication system.

FIG. 1 schematically illustrates a mobile (cellular) telecommunication system 1 in which users of mobile communication devices 3 can communicate with other users via base stations 5. In the system illustrated in FIG. 1, the base station 5 shown is an Evolved Universal Terrestrial Radio Access Network (E-UTRAN) base station capable of operating in a multi-carrier environment. Such base stations are commonly referred to as eNBs (Evolved NodeBs). In this embodiment, it will be assumed, for the sake of simplicity of explanation, that the mobile device 3 is in communication with only one base station 5 at a time, although, in deployed systems, a mobile device 3 might communicate with several base stations in parallel.

In FIG. 1, the base station 5 operates in a plurality of cells using respective component carriers (CCs) C1 and C2, of a component carrier set. In this embodiment, the base station 5 operates component carrier C1 as a primary component carrier on which a primary cell (PCell) is provided, and component carrier C2 as a secondary component carrier on which a secondary cell (SCell) is provided. The base station 5 operates carrier C1 for the PCell as a stand-alone carrier having an ePDCCH, which can be used to schedule the resources of its own component carrier C1. The ePDCCH of component carrier C1 can also be used to schedule the resources of component carrier C2 ('cross carrier scheduling') to be used by a mobile device 3 when communicating using the resources of component carrier C2. The ePDCCH is transmitted on an aggregation of one or several enhanced control channel elements (eCCEs).

The mobile device 3 is configured to provide regular feedback to the base station 5 about the perceived signal quality. The feedback is based on signal measurements performed during the periods when the mobile device 3 is not scheduled to communicate with the base station 5. Based on the result of measurements, the mobile device 3 generates and sends a report back to the base station 5. This feedback mechanism is called channel quality indication (CQI) and it is employed to fine-tune the operation of the base station 5, including resource allocation, scheduling and power of transmission. The mobile device 3 reports the channel state information (CSI) such as CQI for each physical resource block (PRB) or group of PRBs in frequency domain of the system bandwidth.

Advantageously, in this example, each mobile device 3 is provided with its own mobile device specific search space comprising a mobile specific set of ePDCCHs in which to search for control information. The search space is dynamically configured (and re-configured) based on the CQI reports periodically transmitted to the base station. Specifically, the search space is configured to comprise ePDCCHs transmitted using resources which have been reported to have the best signal quality. Such a CQI-based search space can be advantageously determined by both the mobile device 3 and the base station 5 using the CQI reports, without additional explicit signaling, and thus both the mobile device 3 and the base station 5 will know, at any point in time, the search space in which the mobile device will look for control information. The benefit for the mobile device 3 and the base station 5 is that control information can be transmitted using resources that have the highest quality signals (and thus the highest likelihood to transmit without error) as indicated by the mobile device 3. Further, the search space can be minimised thereby reducing the length of time taken and processing resources used for locating the control signals.

Advantageously, the resources used to transmit the ePDCCHs in each cell are restricted to alleviate ePDCCH interference between neighbouring or overlapping cells. Specifically, different resources are used to transmit the ePDCCHs in different cells. This is achieved by basing the dynamic search space configuration on the identity of the cell (e.g. Cell ID) such that different resources are used by different cells for ePDCCH transmission. In a particularly advantageous example, the cell specific search space design is based both on the identity of the cell and the number of the sub-frame for the current communication such that the cell specific resources available for transmission of the ePDCCH vary in time as well as in dependence on the cell identity thereby ensuring that even though the range of resources in a specific subframe are restricted, the entire range of resources will nevertheless be available for use over time.

The base station 5 is also beneficially configured to use a 'fallback' search space in the event that the CQI report has not been received by the base station 5, or in case the CQI report cannot be decoded due to an error. The mobile device 3 falls back to this fallback search space in the event that it cannot find control signaling in the dynamically configured mobile device specific search space. The use of a fallback search space therefore helps to ensure uninterrupted transmission between the mobile device 3 and the base station 5.

In overview, therefore, the communication system advantageously allows exploitation of the frequency selection gain available by transmitting ePDCCH in frequencies in which the mobile device 3 has better channel conditions, thereby providing significant advantages over the legacy PDCCH search space design.

Operation

Figure 2:
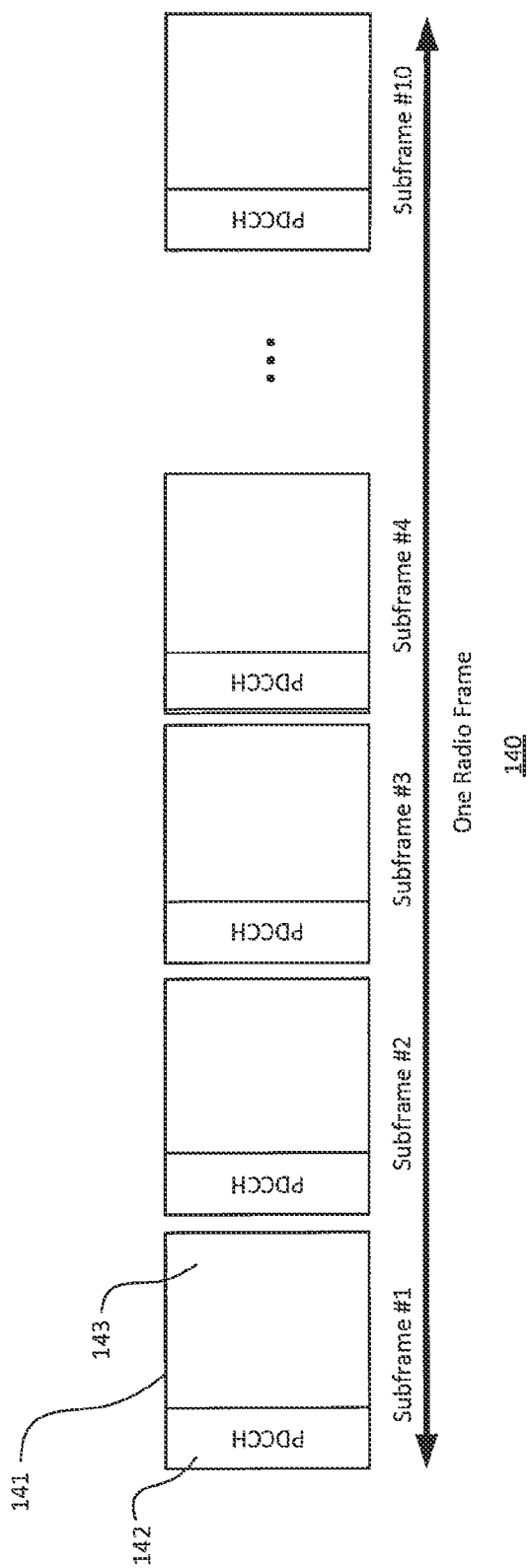
FIG. 2 illustrates a radio frame for the telecommunication system of FIG. 1.

FIG. 2 illustrates a radio frame 140 for the telecommunication system 1 of FIG. 1. The resources of the radio frame 140 are divided into ten subframes 141, in each of which a first part 142 of the sub-frame 141 may be used to carry a PDCCH (e.g. for legacy devices). Historically, the remainder 143 of each sub-frame comprises resources used for transmitting a Physical Downlink Shared Channel (PDSCH) and part of which, in the present embodiment, may be used for transmitting an ePDCCH.

Figure 3:
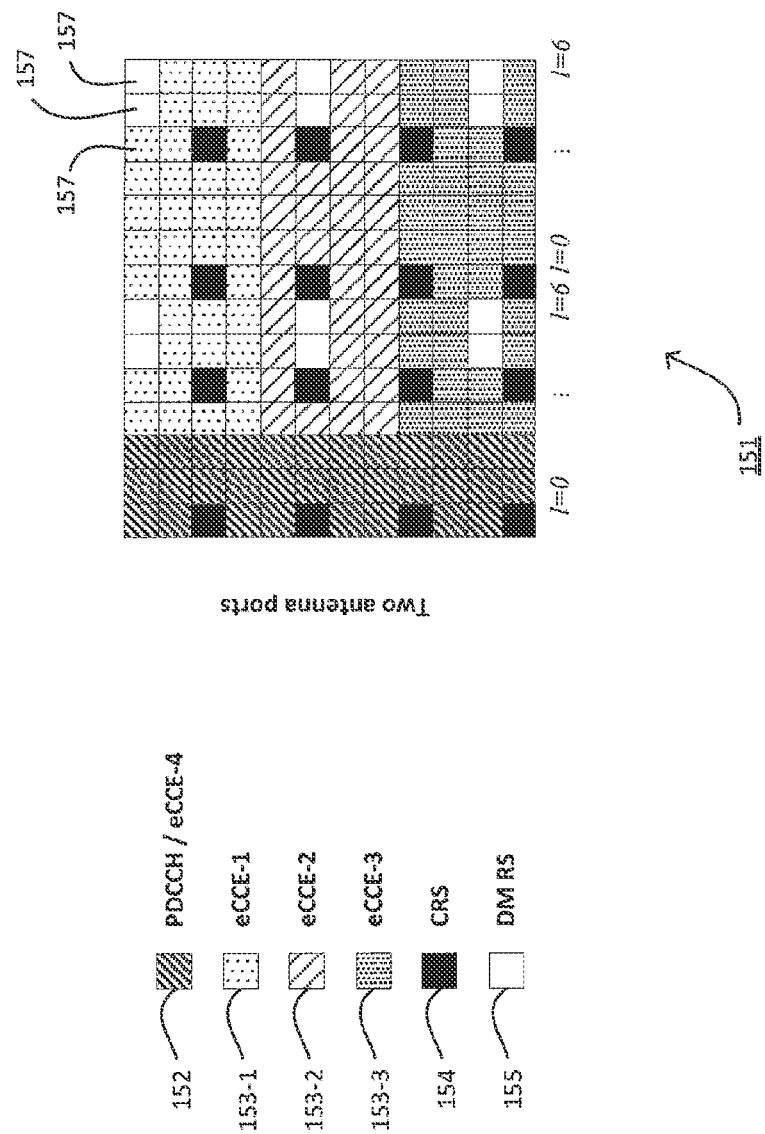
FIG. 3 shows a simplified illustration of a resource grid used in the telecommunication system of FIG. 1.

FIG. 3 shows a simplified illustration of a typical resource grid of a PRB pair 151 used in the telecommunication system 1 of FIG. 1. The PRB pair comprises a number of resource elements 157 defined in time (i.e. in columns corresponding to 'symbols' along the horizontal axis of FIG. 3) and frequency (i.e. in rows corresponding to each 'sub-carrier' along the vertical axis of FIG. 3). Each ePDCCH consists of an aggregation of control channel elements ('eCCEs'). Each eCCE occupies a predefined number of resource elements, e.g. the same number as the legacy PDCCH CCEs. Each eCCE starts at a fixed location within the PRB pair 151. In this example, one PRB pair 151 supports three eCCEs 153-1, 153-2 and 153-3. If the first resource elements of the three symbols are not used for a legacy PDCCH then the number of potential eCCEs per PRB pair could be increased to four by using the first three symbols for a fourth eCCE. The PDCCH 152 is carried in the first part of the subframe 151, as shown generally in the left hand side area of the PRB pair 151 of FIG. 3.

Some resource elements of the PRB pair 151 are also used to carry cell reference signals (CRS) 154 and demodulation reference signals (DM RS) 155, both of which are transmitted by the base station 5 periodically, at predetermined intervals and predetermined locations within a PRB pair. These signals are used to provide reference signal levels and to inform the mobile device 3 about the current operation of the base station 5. Resource elements can be transmitted at varying energy levels but the CRS 154 resource elements are always transmitted at a known (e.g. a default) energy level. The mobile device 3 can thus carry out signal quality measurements over the CRS 154 resource elements and, based on these measurements, can indicate to the base station 5 the perceived signal quality of a given frequency band (of a given cell) operated by the base station 5.

Starting from the 4$^{th}$ symbol of the PRB pair, and extending to the last symbol (as seen in FIG. 3), the remaining resource blocks of the resource block pair 151 are divided into the three eCCE areas 153-1 to 153-3.

A search space for a particular mobile device consists of a collection of ePDCCHs in which to search for control information for that mobile device 3. The mobile device 3 monitors all the ePDCCHs in its search space in every subframe to detect control information such as scheduling grants from the base station 5. Ideally, the size of the search space should be as small as possible to minimise the processing burden on the mobile device 3. However, smaller search spaces also place greater restrictions on the base station's scheduling algorithm.

The number of eCCEs making up one ePDCCH is called the aggregation level, and the mobile device 3 search space contains ePDCCHs with a mixture of aggregation levels. Table 1 shows the typical size of the mobile device 3 search space, which is based on the size of the legacy PDCCH search space. However the actual size of the ePDCCH search space is not yet defined by 3GPP, and may even be configurable by higher layer signaling.

In order to place the ePDCCH for a mobile device 3 in the best location in frequency domain when it is transmitted, dynamic configuration of each mobile device's search space is carried out based on the periodic CQI measurements performed by the given mobile device 3. The following section describes a method for CQI-based search space selection in more detail. In the following, 'PRB' will be used as shorthand for 'PRB pair'.

TABLE 1 ePDCCH candidates monitored by a mobile device (N = 3)

| | Search space $S_k^{(L)}$ | | Number of | Number of PRB-pairs n | Number of PRB-pairs n |
|---|---|---|---|---|---|
| Type | Aggregation level L | Size $N_{CCE, L}$ [in eCCEs] | ePDCCH candidates $M^{(L)}$ | (Localised eCCE allocation) | (Distributed eCCE allocation) |
| UE-specific | 1 | 6 | 6 | 2 | N/A |
| | 2 | 12 | 6 | 4 | 4 |
| | 4 | 24 | 6 | 8 | 8 |
| | 8 | 32 | 4 | 11 | 11 |

CQI-Based Search Space Selection

In this example $N_{eCCE}$ is the total number of eCCEs in the system bandwidth, and $0 \le i < N_{eCCE}$ is an index which uniquely identifies each eCCE. It is assumed that the eCCEs are numbered in non-decreasing frequency order; specifically if $i_2 > i_1$ then the PRB number of the PRB containing eCCE number $i_2$ is not less than the PRB number of the PRB containing eCCE number $i_1$.

For aggregation level L, the mth ePDCCH candidate consists of the contiguous set of L eCCEs which satisfy the condition i=m·L+l, where 0≤l<L and $$0 \le m < \left\lfloor \frac{N_{eCCE}}{L} \right\rfloor.$$

The above defines a set of ePDCCH candidates for each aggregation level. The aim of the CQI-based search space selection is to construct a search space for each mobile device 3 consisting of ePDCCHs taken from these sets, such that the ePDCCHs with the best channel quality are selected.

Each mobile device 3 reports a CQI for each CQI reporting sub-band (referred to simply as sub-bands in the following), where a CQI reporting sub-band is a block of contiguous PRBs. The size and location of the sub-bands depends on the system bandwidth as specified in the 3GPP TS 36.213 standard.

Figure 4:
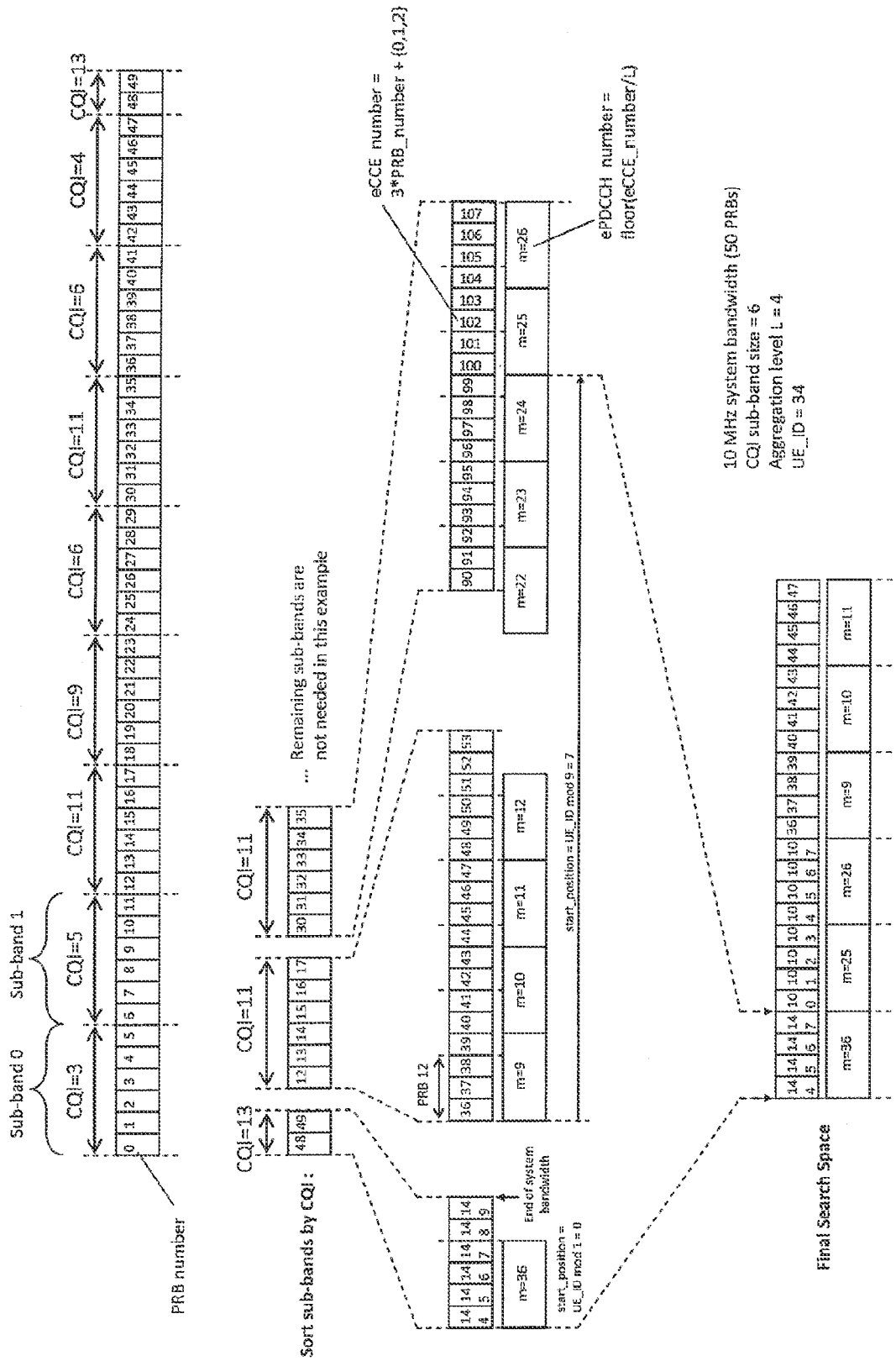
FIG. 4 shows an example of a CQI-based search space selection mechanism in the telecommunication system of FIG. 1.

FIG. 4 shows an example of a CQI-based search space selection mechanism in the telecommunication system 1 of FIG. 1. For each mobile device 3 and at each aggregation level, this procedure is performed by both the respective mobile device 3 and the base station 5 for determining the search space without explicit signaling.

Initially, in a first stage, the sub-band (or sub-bands) with the best CQI for the given mobile device 3 is identified. This can be achieved, for example, by sorting the sub-bands according to their CQI parameter, once the results of the CQI measurements are available at the mobile device 3 or the base station 5, respectively.

In a second stage, all the ePDCCH candidates are found for the aggregation level L which belongs to the sub-band or sub-bands identified in the first stage. An ePDCCH candidate m is said to belong to a sub-band if more than half of the eCCEs in the ePDCCH candidate lie inside the sub-band, or exactly half of the eCCEs of the ePDCCH candidate lie inside the sub-band including the last eCCE (i.e. eCCE number i=m·L+(L−1)).

Then, in the third stage, the list of ePDCCH candidates found in the second stage is sorted in ascending order of ePDCCH number m. Then, where K is the number of ePDCCH candidates on the list, the first UE_ID mod K entries on the list are taken and moved to the end (where the integer UE_ID may be any UE-specific identifier which is known to both the mobile device 3 and base station 5).

In the fourth stage, the ePDCCH candidates are read from the sorted list generated in stage three and are added to search space for that mobile device. This is repeated until either the search space attains the required size or the list is exhausted. If the list is exhausted and the search space has not reached the required size then the sub-band (or sub-bands) with the next best CQI is found, and the procedure repeated from the second stage.

The first to fourth stages described above beneficially ensure a dynamic configuration of the mobile device specific search space based on the CQI reports from the given mobile device 3. Advantageously, each mobile device specific search space comprises the best (or close to the best) ePDCCHs from all ePDCCH candidates within the cell. The base station 5 allocates the ePDCCH in decreasing order of channel quality based on the reported CQI. By employing the same technique, the mobile device 3 searches for the ePDCCH in decreasing order of channel quality based on its CQI, therefore, both the base station 5 and the mobile device 3 are able to identify the search space for a specific mobile device without the need for additional signaling between them. Accordingly, the base station is able to identify appropriate resources of the mobile device specific search space for transmitting an ePDCCH for the mobile device and the mobile device is able to search efficiently for control information, such as scheduling assignments or the like, within the search space. This technique also allows for dynamic configuration (e.g. by higher layer signaling) of the size of the search space.

Inter-Cell Interference Co-Ordination

In order to reduce ePDCCH interference between cells operated by the base station 5 or by neighbouring base stations, it is possible to restrict which PRBs are to be used to transmit ePDCCH in each cell. Advantageously, base stations 5 are configured to avoid using the same PRBs in neighbouring or overlapping cells.

Specifically, in this example, the eCCE numbering described above takes into account only the PRBs that are available for ePDCCH transmission in the given cell. The other PRBs are skipped (i.e. they do not contain any eCCEs). The rest of the CQI-based search space selection procedure is performed as described in the previous section.

To control which PRBs may be used by each cell, each cell is given an assignment identifier ('Assignment ID') which identifies a set of PRBs to use for search space definition. One way to do this is to determine the Assignment ID from the cell ID, as follows:

AssignmentID=Cell ID mod P where P is the number of PRB sets.

In a variation on this, the Assignment ID in a particular cell may be varied over time, for example by using the current sub-frame number, as follows:

AssignmemtID=(Cell Subframe_Number) mod P

In this embodiment, two options are provided for the definition of the PRB sets selected by the Assignment ID as follows:
Type 0: Localised transmission, in which the PRB-pairs used in one cell are localised (i.e. contiguous) in the frequency domain in the system bandwidth;
Type 1: Distributed transmission, in which the PRB-pairs used in one cell are distributed in frequency domain in the system bandwidth.

Table 2 illustrates an example of a cell specific search space design based on system bandwidth of 50 PRBs and P=3.

TABLE 2

Cell specific search space configured in a subframe in FDD system

| Assignment ID | PRB Number for Localised Transmission (Type 0) | PRB Number for Distributed Transmission (Type 1) |
| --- | --- | --- |
| 0 | 0 to 15 | 0, 3, 6, 9, 12, 15, 18, 21, 24, 27, 30, 33, 36, 39, 42, 45 |
| 1 | 16 to 31 | 1, 4, 7, 10, 13, 16, 19, 22, 25, 28, 31, 34, 37, 40, 43, 46 |
| 2 | 32 to 47 | 2, 5, 8, 11, 14, 17, 20, 23, 26, 29, 32, 35, 38, 41, 44, 47 |

Accordingly, a cell specific search space design based on the Cell ID and subframe number can be used to achieve interference co-ordination between neighbouring cells. In this example, a fraction of the bandwidth designated for ePDCCH allocation can be re-configured via higher layer signaling, based on e.g. the number of co-ordinating cells.

Fallback Operation

In the event when the base station 5 fails to decode the CQI report(s) transmitted by a mobile device 3 correctly, the base station 5 will not be able to derive the CQI-based search space assumed by the mobile device 3 (which of course will have its own CQI data). Therefore, the base station 5 will not be able to send scheduling grants to the given mobile device 3. Advantageously, therefore, to recover from this situation, a 'fallback' search space is provided, which is monitored by the mobile device 3 in addition to its CQI-based search space. Such a fallback search space has the added benefit that it can also be used by mobile devices 3 that do not generate sub-band CQI reports.

Figure 5:
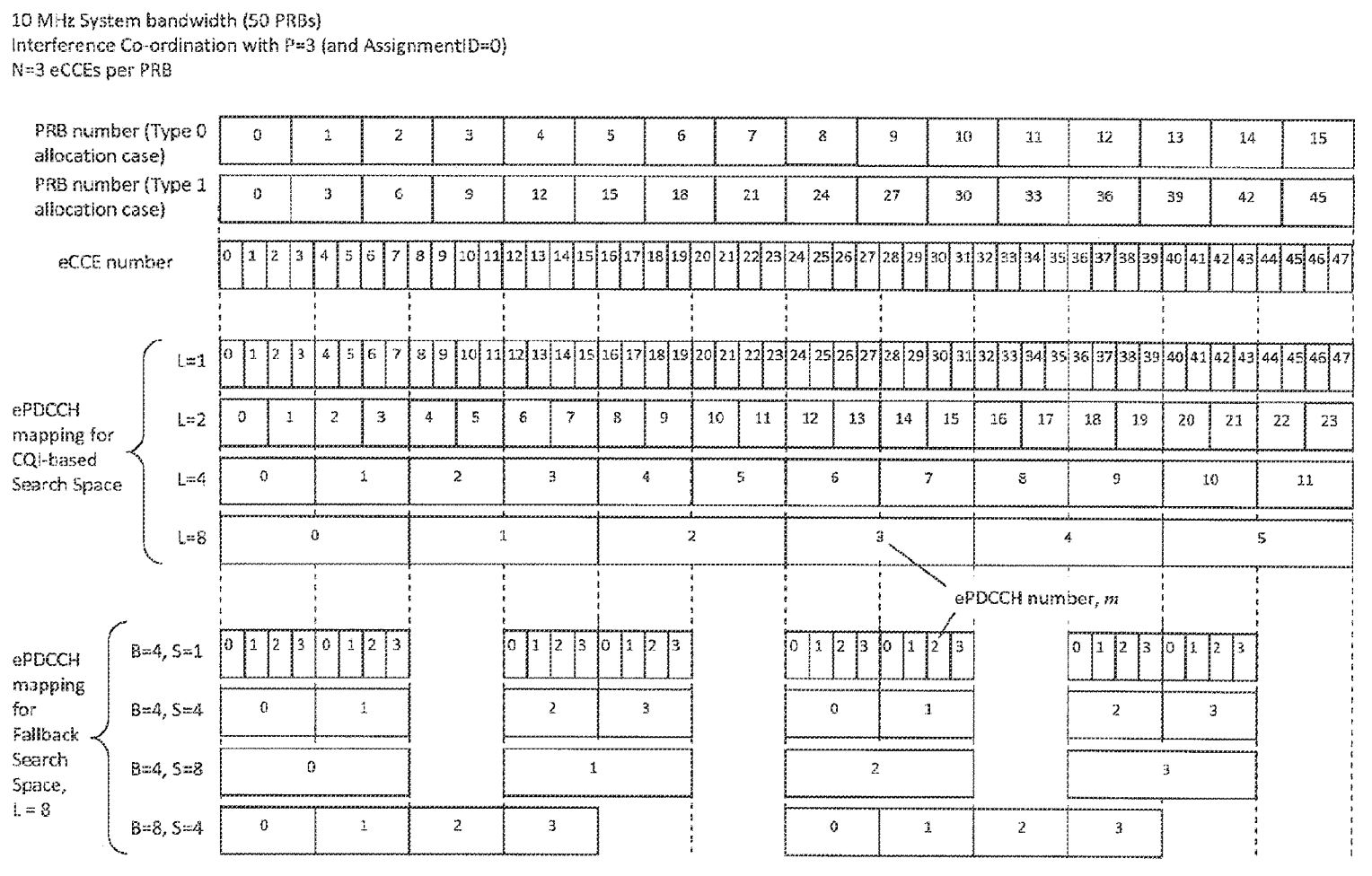

FIG. 5 shows an example of a fallback search space selection mechanism in the telecommunication system 1 of FIG. 1.

The fallback search space uses eCCEs which are also used for the CQI-based search space. In any given sub-frame, any eCCE in the fallback search space that is not used to transmit a fallback ePDCCH may be used to transmit a CQI-based ePDCCH (and vice-versa).

If L is the aggregation level used for the fallback search space, the size of the search space may be any multiple of L eCCEs (i.e. a whole number of ePDCCHs), with the exact size chosen on the basis of system bandwidth and expected traffic.

In order to ensure reliable transmission, each fallback ePDCCH is preferably transmitted with frequency diversity, i.e. the eCCEs comprising the ePDCCH should be widely separated in frequency. Furthermore, when a fallback ePDCCH is transmitted, any CQI-based ePDCCH which is mapped to any of the same eCCEs as the transmitted fallback ePDCCH cannot also be transmitted in the same sub-frame. Preferably, such restrictions on the scheduler algorithm should be minimised. In particular, each fallback ePDCCH should overlap with as few CQI-based ePDCCHs as possible.

A method for constructing the fallback search space is described as follows.

All eCCEs in the system bandwidth are divided into contiguous blocks of size B eCCEs. A sub-set of these blocks is then selected such that it contains the fallback search space. If the total number of eCCEs required for the fallback search space is $N_{FB}$ (which is a multiple of L, the ePDCCH size) and the total number of eCCEs available in the cell is $N_{eCCE}$, then the blocks used to carry the fallback space are selected, in this example, by using the blocks which start at the eCCE numbers given by the following:

$$i = B \cdot \left\lfloor k \cdot \left( \frac{B \cdot \left\lfloor \frac{N_{eCCE}}{B} \right\rfloor}{N_{FB}} \right) \right\rfloor$$

$$0 \le k < \left\lceil \frac{N_{FB}}{B} \right\rceil.$$

where $\lfloor \bullet \rfloor$ denotes the 'floor' function and $\lceil \bullet \rceil$ denotes the 'ceiling' function. Advantageously, this has the effect of distributing the fallback space blocks as evenly as possible throughout the total available eCCEs.

For example, if B=4, $N_{eCCE}$=48 and $N_{FB}$=32 then the blocks beginning at eCCE numbers 0, 4, 12, 16, 24, 28, 36 and 40 are used. This case is illustrated in FIG. 5, which also assumes interference co-ordination with P=3 cells.

Although any value of B may be used, blocking performance will generally be improved if B is chosen to match one of the aggregation levels used for the CQI-based search space.

After having selected the eCCEs which comprise the fallback search space, the individual ePDCCHs are mapped to these eCCEs. If j is the eCCE index into the list of $N_{FB}$ eCCEs selected by the above procedure, the jth eCCE in the fallback search space can be assigned to the mth ePDCCH, given by $$m = \left\lfloor \frac{j}{S} \right\rfloor \mod \left( \frac{N_{FB}}{L} \right)$$

$$0 \le j < N_{FB}$$

where S is a sub-multiple of L (for example, if L=8 then S may be 1, 2, 4 or 8). Effectively, the value of S controls the degree of frequency distribution of the eCCEs belonging to each ePDCCH. The case S=1 corresponds to fully distributed transmission and S=L corresponds to fully localised transmission. Intermediate values can be regarded as 'block distributed'.

S=1 provides the most advantageous frequency diversity, but only at the expense of relatively poor blocking between the fallback search space and CQI-based search space. An intermediate value of S represents a good trade-off between these two requirements. Some further examples are also illustrated in FIG. 5.

Mobile Communication Device

Figure 6:
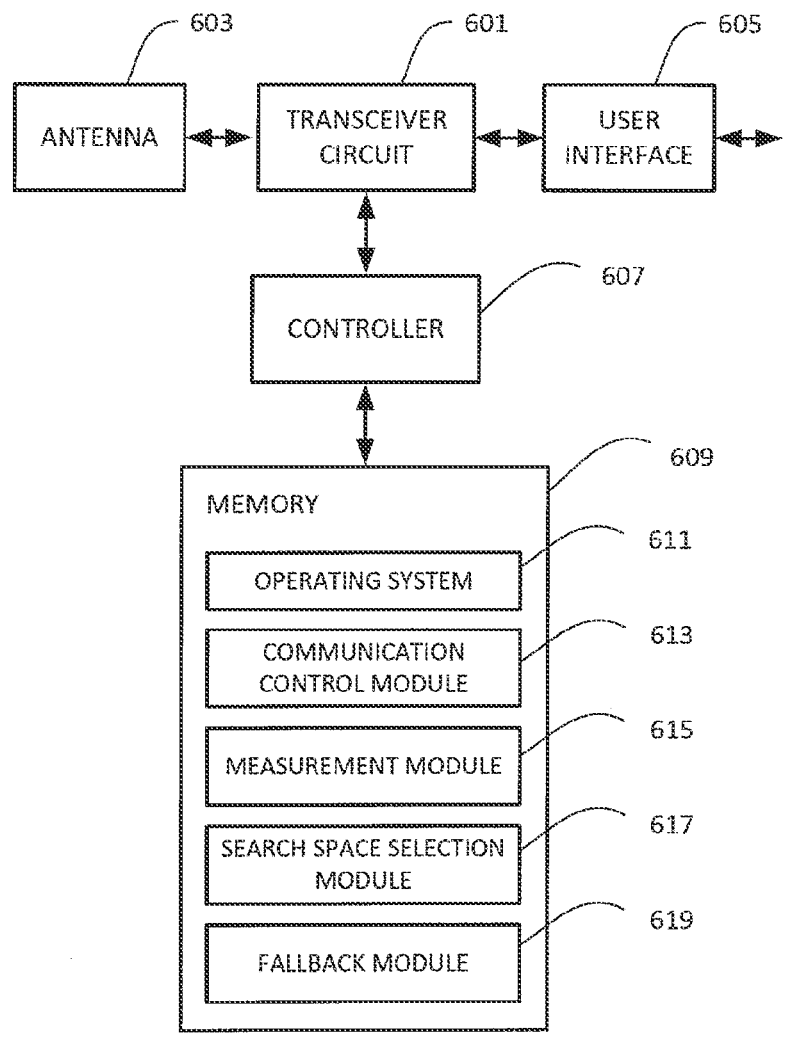
FIG. 6 shows a simplified block diagram of a base station for the telecommunication system of FIG. 1.

FIG. 6 is a block diagram illustrating the main components of the mobile communication device 3 shown in FIG. 1. The mobile communication device 3 comprises a mobile (or 'cell' telephone) capable of operating in a multi-carrier environment. The mobile communication device 3 comprises a transceiver circuit 601 which is operable to transmit signals to, and to receive signals from, the base station 5 via at least one antenna 603. The mobile device 3 also includes a user interface 605 which allows a user to interact with the mobile device 3.

The operation of the transceiver circuit 601 is controlled by a controller 607 in accordance with software stored in memory 609. The software includes, among other things, an operating system 611, a communication control module 613, a measurement module 615, a control channel search space module 617, and a fallback module 619.

The communication control module 613 is operable for managing communication with the base station 5 on the associated component carriers C1, C2. The measurement module 615 receives measurement configuration information from the base station 5 for the purposes of configuring the mobile communication device 3 to take measurements of the CSI.

The measurement module 615 manages performance of the measurements of CSI, generates associated measurement reports and transmits the generated reports to the base station 5. The measurement module 615 also determines reference signal received power (RSRP) for the cells. In this embodiment, the measurement module 615 is operable to carry out signal quality measurements during the periods when the mobile device 3 is not scheduled to communicate with the base station 5. Based on the result of measurements, the measurement module 615 generates and sends a CSI report (including the CQI) back to the base station 5.

The search space selection module 617 is operable to use the measurements of CSI, such as the CQI to determine the eCCE resources carrying the ePDCCH for use by the mobile device 3. This determination can be carried out for each subframe 141 transmitted between the base station 5 and the mobile device 3. Alternatively, the determination can be carried out whenever the CQI values are updated.

The fallback module 619 is operable to select and monitor a fallback search space, in case the measurements of CSI have not been received or correctly decoded by the base station 5. The fallback module 619 is also operable to select the search space in case the sub-band CQI reports have not been generated by the mobile device 3 (e.g. in the absence of instructions from the base station 5 or due to technical limitations of the mobile device 3).

Base Station

Figure 7:
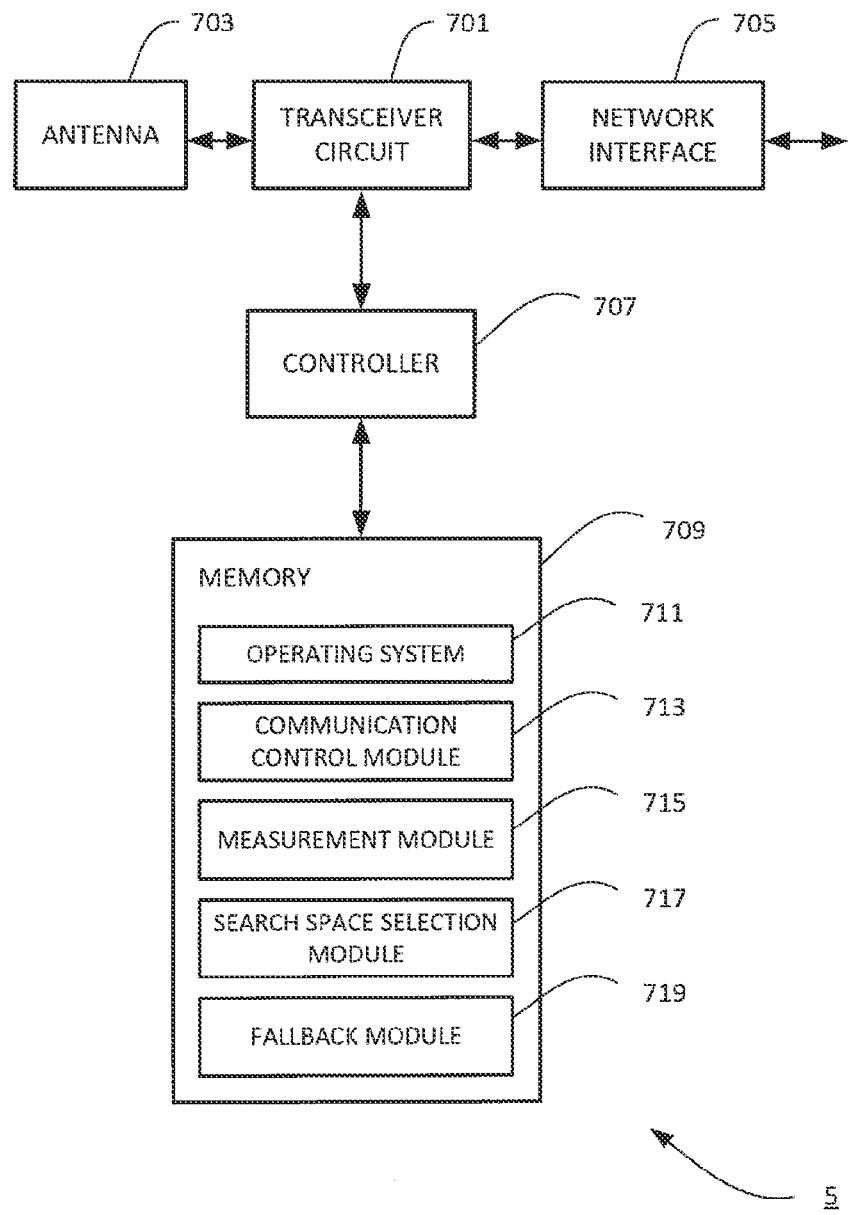
FIG. 7 shows a simplified block diagram of a mobile communication device for the telecommunication system of FIG. 1.

FIG. 7 is a block diagram illustrating the main components of the base station 5 shown in FIG. 1. The base station 5 comprises an E-UTRAN multi-carrier capable base station comprising a transceiver circuit 701 which is operable to transmit signals to, and to receive signals from, the mobile device 3 via one or more antennas 703. The base station 5 is also operable to transmit signals to and to receive signals from a core network 7 via a network interface 705. The operation of the transceiver circuit 701 is controlled by a controller 707 in accordance with software stored in memory 709.

The software includes, among other things, an operating system 711, a communication control module 713, a measurement module 715, a control channel search space module 717, and a fallback module 719.

The communication control module 713 is operable to control communication with mobile device 3 on the component carriers C1, C2, of its component carrier set. The communication control module 713 is also responsible for scheduling the resources of the primary and extension component carrier C1, C2 to be used by the mobile devices 3 served by this base station 5.

The measurement module 715 is operable to communicate with the mobile device 3 for configuring the mobile device 3 to initiate measurement of the CSI. The measurement module 715 is also operable to receive and analyse measurement reports from the mobile devices 3 in order to assess the channel state for the purposes of search space selection. The measurement module 715 also obtains, from the transceiver circuit 701, the current reference signal power transmitted in the cells served by the base station 5.

The search space selection module 717 is operable to use the measurements of CSI, such as the CQI to determine the eCCE resources for carrying the ePDCCH for the respective mobile device(s) 3. This determination can be carried out for each subframe 141 transmitted between the base station 5 and the mobile device 3. Alternatively, the determination can be carried out whenever the CQI values are updated.

The fallback module 719 is operable to select a fallback search space, in case the measurements of CSI have not been received or correctly decoded by the base station 5. The fallback module 719 is also operable to locate the search space in case the sub-band CQI reports have not been generated by the mobile device 3 (e.g. in the absence of instructions from the base station 5 or due to technical limitations of the mobile device 3).

In the above description, the mobile device 3 and the base station 5 are described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Figure 8:
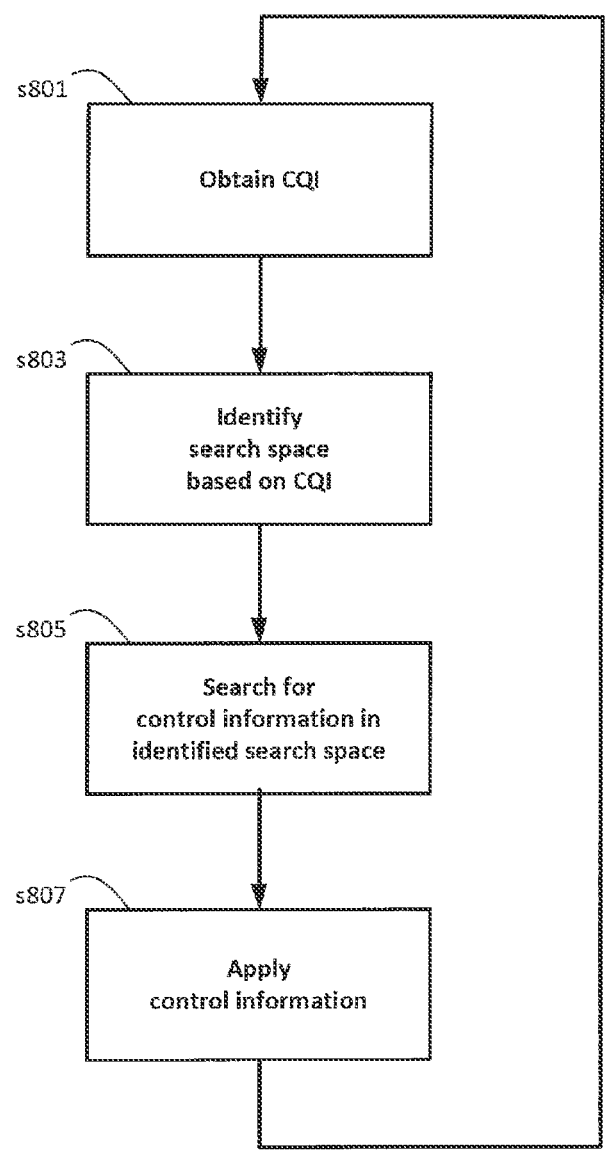
FIG. 8 is an exemplary flow diagram illustrating the steps performed by a mobile communication device in the telecommunication system of FIG. 1.

FIG. 8 is an exemplary flow diagram illustrating the steps performed by a mobile communication device 3 in the telecommunication system 1 of FIG. 1.

The procedure starts in step s801, in which the mobile device 3 obtains measures of communication quality for the communication resources operated by the base station 5. The measures can be, for example, the CQI values obtained by channel quality measurements (not shown) performed over the reference signals transmitted by the base station 5. The communication resources can be, for example, the cells or the sub-bands of the base station 5.

Next, in step s803, the mobile device 3 identifies the search space based on the obtained measure, such as by selecting the sub-bands having the highest CQI values. In step s805, the mobile device 3 is searching for control information, such as a mobile device specific control channel, in the identified search space. As shown in step s807, once control information is found, e.g. when it has been transmitted by the base station 5 to the mobile device 3 within the identified search space, the mobile device 3 applies the control information. For example, the mobile device 3 can send and receive user data according to the instructions carried in the control channel (e.g. ePDCCH) within the search space.

Advantageously, the procedure is repeated from step s801 whenever the communication quality for the communication resources changes and the mobile device 3 obtains new measures of the changed communication quality (e.g. updated CQI).

Figure 9:
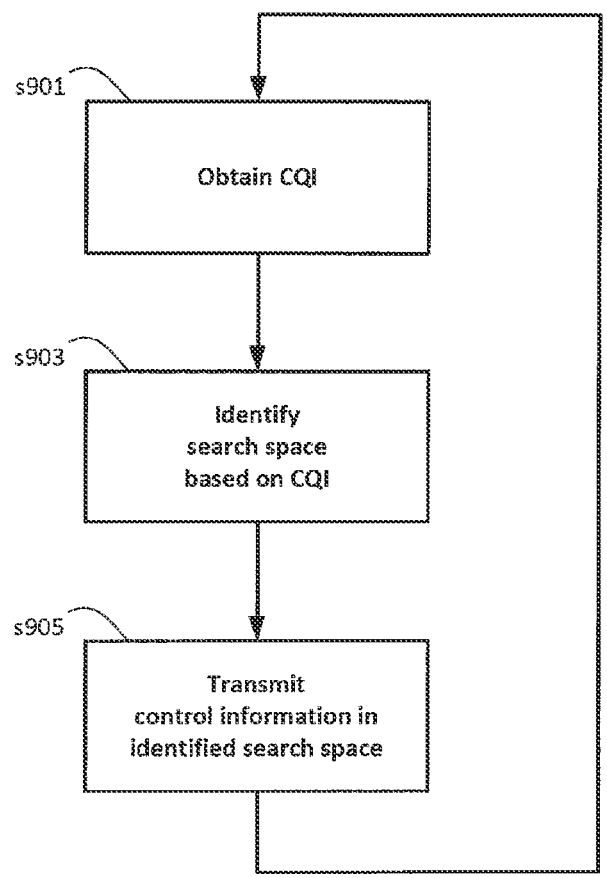
FIG. 9 is an exemplary flow diagram illustrating the steps performed by a base station in the telecommunication system of FIG. 1.

FIG. 9 is an exemplary flow diagram illustrating the steps performed by abase station 5 in the telecommunication system 1 of FIG. 1.

The procedure starts in step s901, in which the base station 5 obtains measures of communication quality for the communication resources operated by the given base station 5. The measures can be, for example, the CQI values obtained through channel quality measurements (not shown) performed by the mobile device 3 over the reference signals transmitted by this base station 5. The communication resources can be, for example, the cells or the sub-bands of the base station 5.

Next, in step s903, the base station 5 identifies the search space based on the obtained measure, such as by selecting the sub-bands having the highest CQI values. Finally, in step s905, the base station 5 transmits control information for the given mobile device 3, such as a mobile device specific control channel e.g. ePDCCH), within the identified search space.

Advantageously, the procedure is repeated from step s901 whenever the communication quality for the communication resources changes and the base station 5 obtains, from the mobile device 3, new measures of the changed communication quality (e.g. updated CQI).

Figure 10:
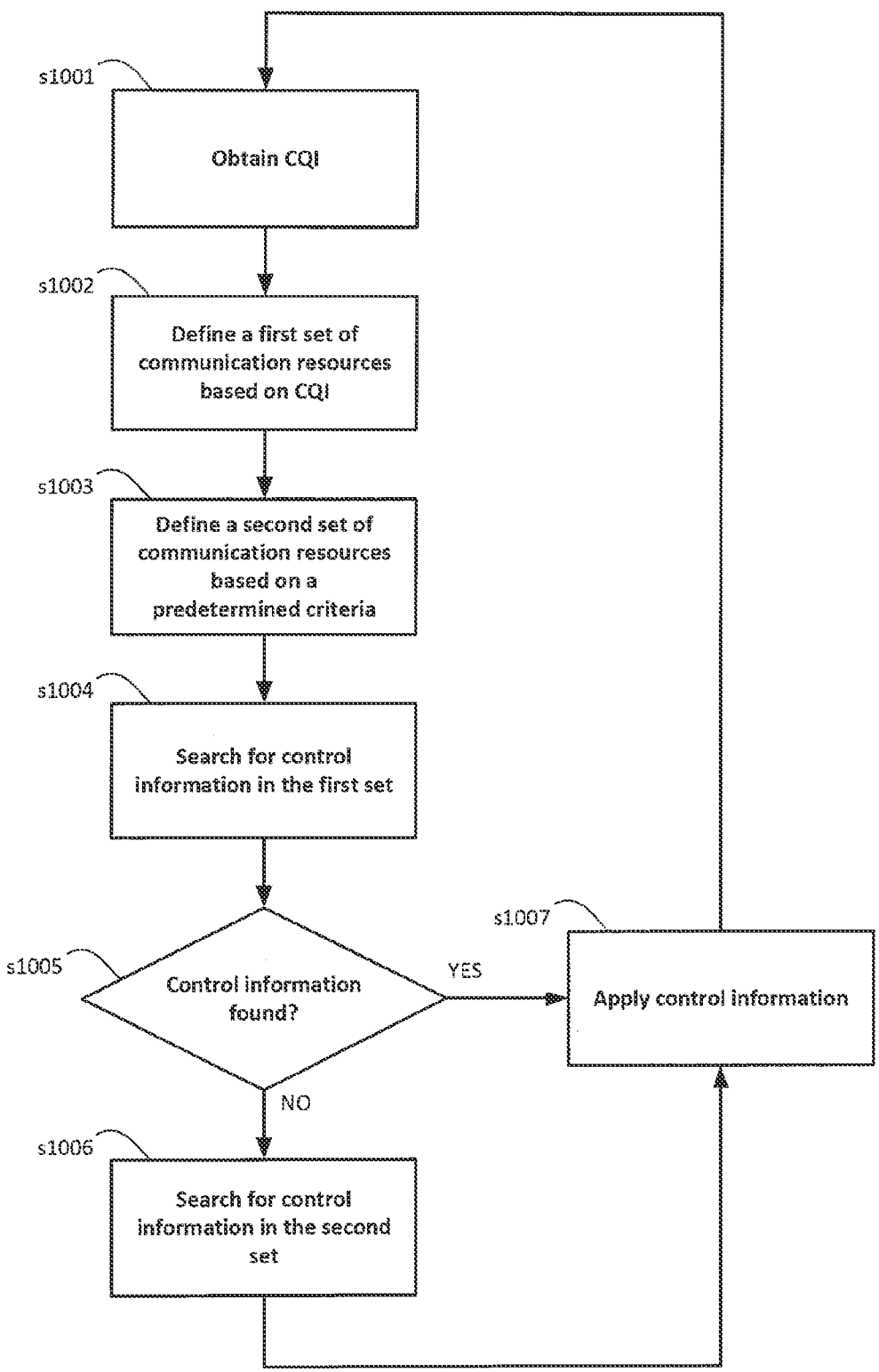
FIG. 10 is an exemplary flow diagram illustrating the steps of a fallback operation performed by a mobile communication device in the telecommunication system of FIG. 1.

FIG. 10 is an exemplary flow diagram illustrating the steps of a fallback operation performed by a mobile communication device 3 in the telecommunication system 1 of FIG. 1.

The procedure starts in step s1001, in which the mobile device 3 obtains measures of communication quality (e.g. CQI) for the communication resources (e.g. sub-bands) operated by the base station 5.

Next, in step s1002, the mobile device 3 defines a first set of communication resources (e.g. a primary search space) specific to this mobile device 3. Advantageously, this first set is defined based on the obtained measures, for example, by selecting the highest quality sub-bands based on their CQI values. In step s1003, the mobile device 3 also defines a second set of communication resources, for example, by selecting sub-bands that have been reserved for this mobile device 3, such as fullback sub-bands.

In step s1004, the mobile device 3 searches for control information in the first set of communication resources. In step s1005, the mobile device 3 determines whether of not control information dedicated to this mobile device 3 can be found in the first set of communication resources. The determination can be based on, for example, the control information transmitted by the base station 5 and checking Whether or not the transmitted control information has been scrambled with an identification (e.g. specific to this mobile device 3.

If the result of the determination at step s1005 indicates that there is control information for this mobile device 3 in the first set of communication resources, the mobile device 3 proceeds to step s1007. If the result of the determination at step s1005 indicates that there is no control information for this mobile device 3 in the first set of communication resources, the mobile device 3 proceeds to step s1006, in which it is searching for control information in the second set of communication resources.

Finally, in step s1007, the mobile device 3 applies the control information if any) found in either the first or the second set of communication resources.

Advantageously, the procedure is repeated from step s1001 whenever the communication quality for the communication resources changes and the mobile device 3 obtains new measures of the changed communication quality (e.g. updated CQI).

Figure 11:
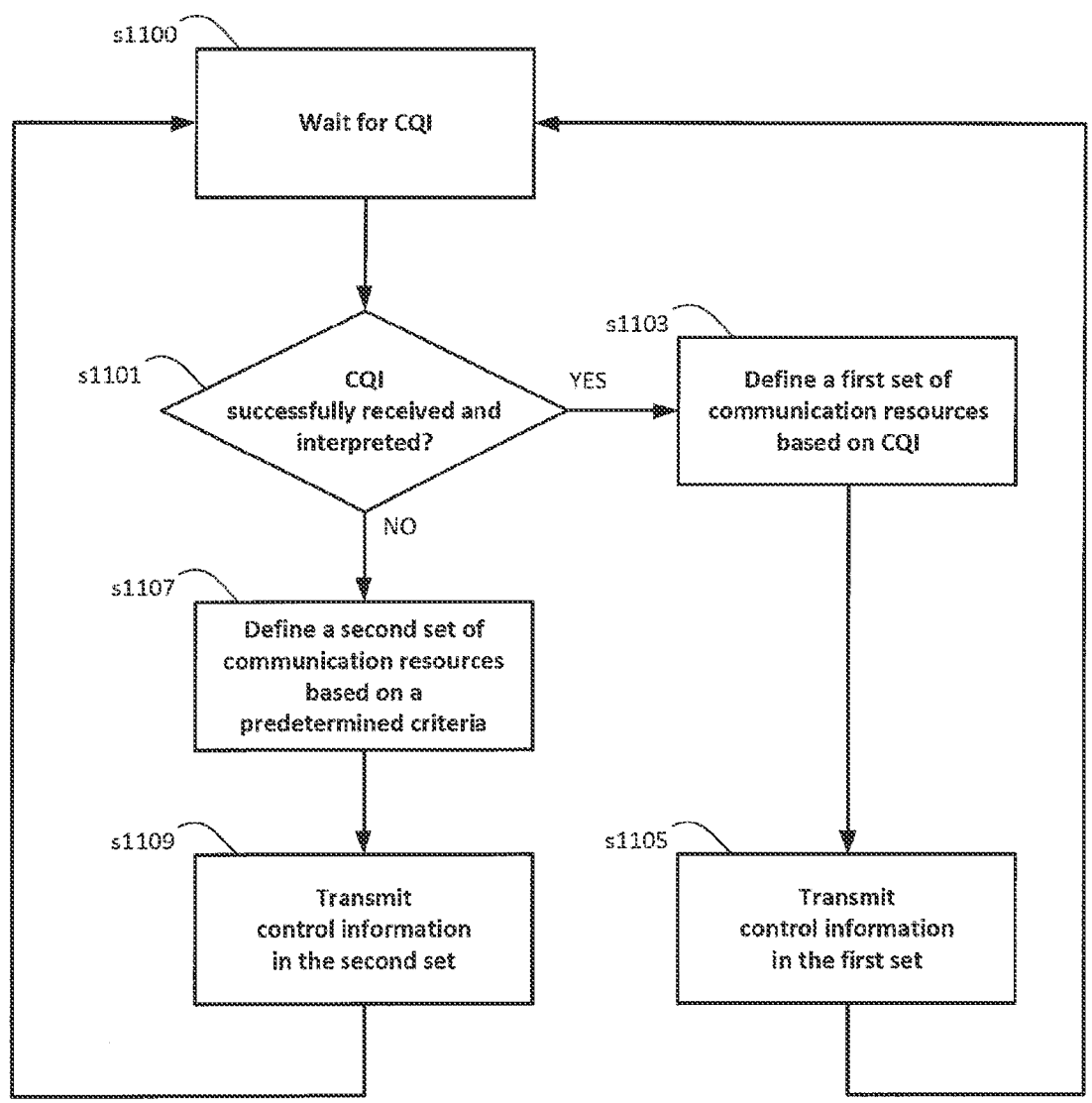
FIG. 11 is an exemplary flow diagram illustrating the steps of a fallback operation performed by a base station in the telecommunication system of FIG. 1.

FIG. 11 is an exemplary flow diagram illustrating the steps of a fallback operation performed by a base station 5 in the telecommunication system 1 of FIG. 1.

The procedure starts in step s1101, in which the base station awaits measures of communication quality (e.g. CQI) from the mobile device 3, the measures concerning the communication resources (e.g. sub-bands) operated by the base station 5.

In step s1101, base station 5 checks whether or not the measures of communication quality have been successfully received and interpreted. If yes, the base station 5 proceeds to step s1103, in which it defines a first set of communication resources for the given mobile device 3. Next, in step s1005, the base station 5 transmits, within the first set of communication resources, control information (e.g. ePDCCH) specific for the mobile device 3.

However, if in step s1101, the base station 5 determines that the measures of communication quality have not been successfully received and interpreted, it proceeds to step s1107. In step s1107, the base station 5 defines a second set of communication resources, for example, by selecting sub-bands that have been reserved for the given mobile device 3, such as fallback sub-bands. In this case, as shown in step s1109, the base station 5 transmits control information to the mobile device 3 in the second set of communication resources.

Advantageously, the procedure is repeated from step s1101 whenever the communication quality for the communication resources changes and the base station 5, from the mobile device 3, obtains new measures of the changed communication quality (e.g. updated CQI).

Modifications and Alternatives

Detailed embodiments have been described above. As those skilled in the art will appreciate, a number of modifications and alternatives can be made to the above embodiments and variations whilst still benefiting from the inventions embodied therein.

It will be appreciated that although the communication system 1 is described in terms of base stations 5 operating as E-UTRAN base stations, the same principles may be applied to base stations operating as macro or pico base stations, femto base stations, relay nodes providing elements of base station functionality, home base stations (HeNB), or other such communication nodes.

Although in FIG. 3, three eCCE areas are shown, it will be appreciated that there might be a different number of eCCEs defined in one subframe, and that the number of eCCEs might from subframe to subframe.

Whilst the example procedure shown on FIG. 4 is described from a purely algorithmic viewpoint, it will be appreciated that more efficient implementations may exist which attain the same outcome. For example, in practice it is not necessary to store and manipulate the entire list of K ePDCCH candidates as implied by the description in the third stage, since in general not all of them will be included in the search space.

In the second stage, the criterion for deciding whether or not an ePDCCH candidate belongs to a sub-band could be simplified to checking if the last (or alternatively first) eCCE of the ePDCCH candidate lies inside the sub-band.

The purpose of the third stage is to try to prevent the mobile devices 3 that share the same best CQI sub-bands from selecting the same ePDCCH candidates. This is achieved by re-ordering the ePDCCH candidates according to a circular shift based on the UE_ID, but other re-ordering methods could also be applied (for example a pseudo-random reordering based on the UE_ID).

Whilst it is stated that the search space selection procedure is repeated for each aggregation level, alternatively, the procedure may be applied for the highest aggregation level only. Accordingly, once the ePDCCH candidates for the highest aggregation level are obtained, they can be sub-divided to obtain the ePDCCH candidates for lower aggregation levels (retaining only the number of ePDCCH candidates required at each level). This would advantageously simplify the procedure, and also ensure that the same set of eCCEs is re-used for each aggregation level, thereby reducing processing complexity in the mobile device 3.

Since the ePDCCHs in the search space are sorted in decreasing order of channel quality, the base station 5 attempts to use first ePDCCHs in the search space whenever possible when transmitting to the mobile device 3. Likewise, the mobile device 3 should attempt decoding in the same order, in order to reduce the average decoding delay.

According to the procedure illustrated in FIG. 4, the search space for a given mobile device 3 may change when a new CQI report is generated. However since there is a finite delay of a few sub-frames between measuring the CQI at the mobile device 3 and the CQI report being received and processed at the base station 5, switching between the old search space and new search space is synchronised such that both the base station 5 and the mobile device 3 perform the switching in the same subframe 141. This can be done, for example, by both the base station 5 and the mobile device 3 applying the change at a scheduling round which is a fixed number of subframes after the CQI report is transmitted to the base station 5. This delay can be configured by separate (e.g. higher layer) signaling, or can be defined as a fixed value (e.g. specified in the relevant standards).

In the CQI-based search space selection procedure described above, the search space is calculated separately by the base station 5 and by the mobile device 3 based on the CQI report. According to an alternative approach, a set of search spaces can be pre-defined, from which the mobile device 3 can select its preferred search space and report the selected search space to the base station 5. In this case, the mobile device 3 selects its preferred search space using e.g. the results of its signal quality measurements or the like. The advantage of this method is that it allows the pre-defined search spaces to be defined in such a way that blocking between mobile devices 3 in different search spaces is less likely, whilst still providing for frequency selection gain by allowing the mobile device 3 to choose the search space that is most favourable for its current channel state.

This method would require new or modified uplink signaling. For example, if a set of 16 search spaces were defined then the choice could be indicated by transmission of a 4-bit value from the mobile device 3 to the base station 5. One option would be to add this signaling to the existing CQI report sent from the mobile device 3 to the base station 5.

According to a variation of this approach, instead of the mobile device explicitly indicating its selection, a search space can be selected by both the mobile device 3 and the base station 5 by applying the same algorithm for the selection of the best pre-defined search space based on the CQI information.

In the description of FIG. 10, step s1003 (defining a second set) has been described as being performed by the mobile device 3 after defining the first set of communication resources. It will be appreciated, that step s1003 can be performed before step s1002. Alternatively, step s1003 can be performed only after step s1005.

In the above embodiments, the component carriers C1 and C2 are transmitted by the same base station. However, it will be appreciated that component carriers might be transmitted by different base stations. In this case, although both base stations might receive respective CQI indications from the mobile device regarding their cells, only one of the base stations will be in charge of the scheduling decisions and the search space allocation. The two (or more) base stations can be arranged to exchange CQI reports between them, thus the base station allocating the ePDCCH search space can obtain the CQI report(s) either directly from the mobile device or via another base station (or via any additional network entity) between them.

The proposed ePDCCH search space design does not affect the support for carrier aggregation because the existing UE monitoring procedure and DCI formats can be reused. For the cross carrier scheduling case where the base station 5 schedules secondary component carrier on the primary cell, the CQI feedback of the primary cell is used since ePDCCH is transmitted in the primary cell. Similarly, only the cell ID of the primary cell is needed for the allocation of cell specific search space. For this case, the number of ePDCCH candidates (i.e. the size of the search space) monitored by the mobile device 3 configured with a carrier indication field can be based on existing formula $m'=m+M^{(L)} \cdot n_{CI}$ as described in the 3GPP TS 36.213 standard.

In the above embodiments, a mobile telephone based telecommunications system was described. As those skilled in the art will appreciate, the signaling techniques described in the present application can be employed in other communications system. Other communications nodes or devices may include user devices such as, for example, personal digital assistants, laptop computers, web browsers, etc. As those skilled in the art will appreciate, it is not essential that the above described relay system be used for mobile communications devices. The system can be used to extend the coverage of base stations in a network having one or more fixed computing devices as well as or instead of the mobile communicating devices.

In the embodiments described above, the base stations 5 and mobile communication devices 3 each include transceiver circuitry. Typically, this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or compiled form and may be supplied to the base station or the relay station as a signal over a computer network, or on a recording medium. Further, the functionality performed by part or all of this software may be performed using one or more dedicated hardware circuits.

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

1. Introduction

From [1] Working Assumption from RAN1#66bis, based on considerations from CA Enhancement new carrier type, CoMP and DL MIMO is as following:

Introduce an enhanced physical downlink control channel that is:
able to support increased control channel capacity
able to support frequency-domain ICIC,
able to achieve improved spatial reuse of control channel resource
able to support beamforming and/or diversity
able to operate on the new carrier type and in MBSFN subframes
able to coexist on the same carrier as legacy UEs Desirable characteristics include ability to be scheduled frequency-selectively, and ability to mitigate inter-cell interference.

In this contribution, we discuss the search space design for e-PDCCH that supports frequency scheduling gain and inter-cell interference co-ordination, as well as its 'Fallback' operation.

2. Discussion 2.1. Considerations of Frequency Scheduling Gain

For the legacy PDCCH, the UE shall monitor a set of PDCCH candidates, attempting to decode each of the PDCCHs in the set according to the monitored DCI formats. The set of PDCCH candidates to monitor are defined in terms of search spaces, as described in section 9.1.1 of [2].

One option is to reuse the legacy PDCCH search space design for ePDCCH. However, since PDCCH REGs are interleaved and span across the whole bandwidth, it would not be possible in this case to exploit frequency selection gain available by transmitting ePDCCH in frequencies in which the UE has better channel conditions.

One ePDCCH consists of an aggregation of elements called eCCEs. FIG. 3 shows an example of eCCE allocation within a PRB pair (The exact method of eCCE allocation is yet to be decided by 3GPP). Each eCCE occupies 36 REs, same as the legacy PDCCH CCE. Each eCCE starts at a fixed location within a PRB pair. In this example, one PRB pair supports N=3 eCCEs. If the legacy PDCCH does not exist in the subframe, the number of eCCEs per PRB pair could be N=4.

Although the example given here contains legacy PDCCH for normal subframe, the deployment scenario of e-PDCCH in this design is considered to be generic, able to provide support for MBSFN subframe, Secondary Component Carrier and new carrier type.

A search space consists of a collection of ePDCCHs. The UE must monitor all the ePDCCHs in its search space in every subframe to detect scheduling grants from the eNB. The size of the search space should therefore be as small as possible to minimise the processing burden on the UE, but smaller search spaces also place greater restrictions on the eNB scheduling algorithm.

The number of eCCEs making up one ePDCCH is called the aggregation level, and the UE search space contains ePDCCHs with a mixture of aggregation levels. Table 1 shows the typical size of the UE search space, which is based on the size of the legacy PDCCH search space. However the actual size of the ePDCCH search space is not yet defined by 3GPP, and may even be configurable by higher layer signaling.

In order to place the ePDCCH for a UE in the best location frequency domain when it is transmitted, dynamic configuration of each UE's search space is necessary based on the periodic CQI measurements performed by the UE. A method for achieving this is described in the following section.

Note that in the following, 'PRB' will be used as a shorthand for 'PRB pair'.

TABLE 1 ePDCCH candidates monitored by a UE (N = 3)

| Type | Search space $S_k^{(L)}$ Aggregation level L | Size $N_{CCE,L}$ [in eCCEs] | Number of ePDCCH candidates $M^{(L)}$ | Number of PRB-pairs n (Localised eCCE allocation) | Number of PRB-pairs n (Distributed eCCE allocation) |
|---|---|---|---|---|---|
| UE-specific | 1 | 6 | 6 | 2 | N/A |
| | 2 | 12 | 6 | 4 | 4 |
| | 4 | 24 | 6 | 8 | 8 |
| | 8 | 32 | 4 | 11 | 11 |

CQI-Based Search Space Selection

Let $N_{eCCE}$ be the total number of eCCEs in the system bandwidth, and let $0 \leq i < N_{eCCE}$ be an index which uniquely identifies each eCCE. We assume that the eCCEs are numbered in non-decreasing frequency order; specifically if $i_2 > i_1$ then the PRB number of the PRB containing eCCE number $i_2$ is not less than the PRB number of the PRB containing eCCE number $i_1$.

For aggregation level L, the mth ePDCCH candidate consists of the contiguous set of L eCCEs which satisfy the condition $i = m \cdot L + l$, where $0 \leq l < L$ and $$0 \leq m < \left\lfloor \frac{N_{eCCE}}{L} \right\rfloor.$$

The above defines a set of ePDCCH candidates for each aggregation level. The aim of CQI-Based Search Space Selection is to construct a search space for each UE consisting of ePDCCHs taken from these sets, such that the ePDCCHs with the best channel quality are selected. This is achieved by the following method.

We assume that each UE reports a channel quality indication (CQI) for each CQI Reporting Sub-band (referred to simply as sub-bands in the following), where a CQI Reporting Sub-band is a block of contiguous PRBs. The size and location of the sub-bands depends on the system bandwidth according to the 3GPP specification [Ref. 36.213].

For each UE and each aggregation level, the following procedure is performed. (This procedure is performed by both the UE and eNB so that both can determine the search space without explicit signaling).

1. Find the sub-band (or sub-bands) with the best CQI for this UP.
2. Find all the ePDCCH candidates for the aggregation level L which belong to the sub-band or sub-bands selected in step 1. An ePDCCH candidate m is said to belong to a sub-band if more than half of the eCCEs in the ePDCCH candidate lie inside the sub-band, or exactly half of the eCCEs of the ePDCCH candidate lie inside the sub-band including the last eCCE (i.e. eCCE number $i = m \cdot L + (L-1)$).
3. Sort the list of ePDCCH candidates selected in step 2 in ascending order of ePDCCH number m. Let K be the number of ePDCCH candidates on the list. Take the first UE_ID mod K entries on the list and place them at the end, where the integer UE_ID may be any UE-specific identifier which is known to both the UE and eNB.
4. Read ePDCCH candidates from the sorted list generated in step 3 and add them to the UE's search space. Continue until either the search space attains the required size or the list is exhausted. If the list is exhausted and the search space has not reached the required size then find the sub-band (or sub-bands) with the next beg CQI, and repeat from step 2.

An example of this procedure is shown in FIG. 4.

Note that the procedure above is described from a purely algorithmic viewpoint and more efficient implementations may exist which attain the same outcome. For example, in practice it is not necessary to store and manipulate the entire list of K ePDCCH candidates as implied by the description in step 3, since in general not all of them will be included in the search space.

In step 2, the criterion for deciding that an ePDCCH candidate belongs to a sub-band could optionally by simplified to checking if the last (or alternatively first) eCCE of the ePDCCH candidate lies inside the sub-band.

The purpose of step 3 is to try to prevent UEs that share the same best CQI sub-bands from selecting the same ePDCCH candidates. This is achieved by re-ordering the ePDCCH candidates according to a circular shift based on the UE_ID, but other re-ordering methods could also be applied (for example a pseudo-random reordering based on the UE_ID).

Above it is stated that the search space selection procedure is repeated for each aggregation level. Alternatively, the procedure may be applied for the highest aggregation level only. Once the ePDCCH candidates for the highest aggregation level are obtained, they are then sub-divided to obtain the ePDCCH candidates for lower aggregation levels (retaining only the number of ePDCCH candidates required at each level). This simplifies the procedure slightly, and also ensures that the same set of eCCEs is re-used for each aggregation level, which may reduce processing complexity in the UE.

Since the ePDCCHs in the search space are sorted in decreasing order of channel quality, the eNB should attempt to use first ePDCCHs in the search space whenever possible when transmitting to the UE. Likewise, the UE should attempt decoding in the same order, in order to reduce the average decoding delay.

Note that according to the above procedure, the search space for a given UE may change when a new CQI report is generated. However since there is a finite delay of a few sub-frames between measuring the CQI at the UE and the CQI report being received and processed at the eNB, care must be taken to synchronise the switching between the old search space and new search space such that both eNB and UE perform the switch in the same sub-frame. This can be done by both eNB and UE agreeing to apply the change a fixed number of sub-frames after the CQI report is transmitted to the eNB. This delay could be configured by separate (higher layer) signaling, or fixed as a constant in the specification.

Proposal 1: Consider dynamic configuration of UE specific search space based on the CQI reports from the UE. Each UE specific search space consists of the best ePDCCHs from all ePDCCH candidates within the cell. UE searches ePDCCH in decreasing order of channel quality (CQI). The size of the search space can be higher layer re-configurable.

2.3. Inter-Cell Interference Co-Ordination

In order to reduce ePDCCH interference between cells, we may choose to restrict which PRBs may be used to transmit ePDCCH in each cell in order to avoid the same PRBs being used in closely neighbouring cells.

In this case, the eCCE numbering described in the previous section is performed taking into account only the PRBs that are available for ePDCCH transmission in the given cell. The other PRBs are skipped (i.e. they do not contain any eCCEs). The remainder of the CQI-Based search space selection procedure is then performed exactly as described in the previous section.

To control which PRBs may be used by each cell, each cell may be given an Assignment ID which identifies a set of PRBs. One way to do this is to determine the Assignment ID from the cell ID, as follows AssignmentID=Cell ID mod P where P is the number of PRB sets.

Furthermore, the Assignment ID in a particular cell may be varied over time, for example by using the current sub-frame number, as follows AssignmentID=(Cell ID+Subframe_Number) mod P Two options exist for the definition of the PRB sets selected by the Assignment), as follows
- Type 0: Localised transmission, in which the PRB-pairs used in one cell are localised (i.e. contiguous) in frequency domain in the system bandwidth.
- Type 1: Distributed transmission, in which the PRB-pairs used in one cell are distributed in frequency domain in the system bandwidth.

Table 2 gives an example of cell specific search space design based on system bandwidth of 50 PRBs and P=3.

TABLE 2

Cell Specific Search Space configured in a subframe in FDD system

| Assignment ID | PRB Number for Localised Transmission (Type 0) | PRB Number for Distributed Transmission (Type 1) |
|---|---|---|
| 0 | 0 to 15 | 0, 3, 6, 9, 12, 15, 18, 21, 24, 27, 30, 33, 36, 39, 42, 45 |
| 1 | 16 to 31 | 1, 4, 7, 10, 13, 16, 19, 22, 25, 28, 31, 34, 37, 40, 43, 46 |
| 2 | 32 to 47 | 2, 5, 8, 11, 14, 17, 20, 23, 26, 29, 32, 35, 38, 41, 44, 47 |

Proposal 2: Consider cell specific search space design based on the Cell ID and subframe number to achieve interference co-ordination. Fraction of bandwidth designated for ePDCCH allocation can be higher layer re-configurable based on the number of co-ordinating cells.

2.4. Fallback Operation

The eNB may sometimes fail to decode the CQI Reports transmitted by the UE correctly. In this case, the eNB will not know the CQI-Based search space being assumed by the UE, and so will be unable to send scheduling grants to the UE. To recover from this situation, it is necessary to introduce a 'fallback' search space, which every UE must monitor continually in addition to its CQI-Based search space.

The fallback search space can also be used for UEs that do not generate sub-band CQI reports.

The fallback search space uses eCCEs which are also used for the CQI-Based search space. In any given sub-frame, any eCCE in the fallback search space that is not used to transmit a fallback ePDCCH may be used to transmit a CQI-Based ePDCCH (and vice-versa).

Let L be aggregation level used for the fallback search space. We assume that the size of the search space may be any multiple of L eCCEs (i.e. a whole number of ePDCCHs), with the exact size chosen on the basis of system bandwidth and expected traffic.

There are two important design considerations for the fallback search space, as follows.
1. For reliable transmission it is preferable if each fallback ePDCCH is transmitted with frequency diversity, i.e. the eCCEs comprising the ePDCCH should be widely separated in frequency.
2. When a fallback ePDCCH is transmitted, any CQI-Based ePDCCH which is mapped to any of the same eCCEs as that fallback ePDCCH cannot also be transmitted in the same sub-frame, placing restrictions on the scheduler algorithm. Such blocking should be minimised. In particular, this suggests that each fallback ePDCCH should overlap with as few CQI-Based ePDCCHs as possible.

One method for constructing the fallback search space is described as follows.

We divide all eCCEs in the system bandwidth into contiguous blocks of size B eCCEs. We then select a sub-set of these blocks to contain the fallback search space. If the total number of eCCEs required for the fallback search space is $N_{FB}$ (which will be a multiple of L, the ePDCCH size) and the total number of eCCEs available in the cell is $N_{eCCE}$, then one way to select the blocks used to carry the fallback space is to use the blocks which start at the eCCE numbers given by the following.

$$i = B \cdot \left\lfloor k \cdot \left( \frac{B \cdot \left\lfloor \frac{N_{eCCE}}{B} \right\rfloor}{N_{FB}} \right) \right\rfloor$$

$$0 \leq k < \left\lceil \frac{N_{FB}}{B} \right\rceil$$

where $\lfloor \bullet \rfloor$ denotes the 'floor' function and $\lceil \bullet \rceil$ denotes the 'ceiling' function. This has the effect of distributing the fallback space blocks as evenly as possible throughout the total available eCCEs.

(For example, if B=4, $N_{eCCE}$=48 and $N_{FB}$=32 then the blocks beginning at eCCE numbers 0, 4, 12, 16, 24, 28, 36 and 40 are used. This case is illustrated in FIG. 5. This figure also assumes interference co-ordination with P=3 cells).

Although any value of B may be used, blocking performance will generally be improved if B is chosen to match one of the aggregation levels used for the CQI-Based search space.

Having selected the eCCEs which comprise the fallback search space, it remains to map the individual ePDCCHs to these eCCEs. Let j be a eCCE index into the list of $N_{FB}$ eCCEs selected by the above procedure. Then we may assign the jth eCCE in the fallback search space to the mth ePDCCH, given by $$m = \left\lfloor \frac{j}{S} \right\rfloor \mod \left( \frac{N_{FB}}{L} \right)$$

$$0 \le j < N_{FB}$$

Where S may be any sub-multiple of L (for example, if L=8 then S may be 1, 2, 4 or 8). The value of S controls the degree of frequency distribution of the eCCEs belonging to each ePDCCHs. The case S=1 corresponds to fully distributed, and S=L is fully localised. Intermediate values are 'block distributed'.

S=1 provides the best frequency diversity, but at the expense of relatively poor blocking between the fallback search space and CQI-Based search space. An intermediate value of S represents a good trade-off between these two requirements.

Some examples are shown in FIG. 5.

Proposal 3: Provide a fallback search space common to all UEs to allow recovery from CQI decoding failure.

2.5. UE Search Space Selection with Uplink Notification to eNB

In the CQI-Based search space selection procedure described above, the search space is calculated separately at eNB and UE based on the CQI report. An alternative approach would be to pre-define a set of search spaces, and allow the UE to select its preferred search space from this set and report its choice to the eNB. In this case the precise method of search space selection may be left for the UE designers to decide.

The advantage of this method is that it allows the pre-defined search spaces to be defined in such a way that blocking between UEs in different search spaces is less likely, whilst still providing for frequency selection gain by allowing the UE to choose the search space that is most favourable for its current channel state.

This method would require some new uplink signaling. For example, if a set of 16 search spaces were defined then the choice could be indicated by transmission of a 4-bit value from UE to eNB. One option would be to add this signaling to the existing CQI report sent from UE to eNB.

2.6. Other Issues

Note that the proposed e-PDCCH search space design shall not affect the support of carrier aggregation scenario. Existing UE monitoring procedure and DCI formats can be reused. For the cross carrier scheduling case where eNB schedules secondary component carrier on the primary cell, the CQI feedback of the primary cell should be used since ePDCCH is transmitted in the primary cell. Similarly, only the cell ID of the primary cell should be needed for the allocation of Cell Specific Search Space. For this case, the number of ePDCCH candidates (i.e. the size of search space) monitored by UE configured with a carrier indication field can be based on existing formula $m'=m+M^{(L)} \cdot n_{CI}$ as described in [2].

REFERENCES

[1] RAN1 Chairman's Notes, RAN1#66bis
[2] 3GPP, TS36.213 (V10.5.0), "E-UTRA; Physical layer procedures", March 2012.

This application is based upon and claims the benefit of priority from United Kingdom patent application No. 1208236.8, filed on May 10, 2012, the disclosure of which is incorporated herein in its entirety by reference.

The invention claimed is:

1. A communication device for communicating with a plurality of further communication devices in a cellular communication system, said communication device comprising:
    communication circuitry configured to communicate, in at least one communication cell operated by communication apparatus of said communication system, using a plurality of subframes, wherein each subframe comprises a plurality of communication resources; and
    control circuitry configured to:
        obtain respective measures of communication quality associated with each of a plurality of communication resources;
        provide information identifying said measures of communication quality to said communication apparatus;
        identify a set comprising a number of said communication resources for a control channel, formed using an aggregation of a plurality of control channel elements (CCEs), in which to search for control information transmitted by said communication apparatus wherein the presence of communication resources in said set is based on said measures of communication quality, wherein said identifying comprises:
        identifying, in order of the communication quality represented by said obtained measures of communication quality, a set of sub-bands; and
        finding, in the identified set of sub-bands in said order of the communication quality, CCE candidates;
        wherein said CCE candidates are added to said set of communication resources until the set for a control channel attains a size required for said aggregation; and
        search for control information in said set of communication resources,
        wherein a search space for the control information is determined based on both an aggregation level of the CCEs making up the control channel for the control information and a total number of the CCEs in a system bandwidth.

2. A device according to claim 1 wherein said control circuitry is operable to identify communication resources for inclusion in said set based on said measures of communication quality obtained by said obtaining means.

3. A device according to claim 1 wherein said wherein said communication device is operable to receive, from said communication apparatus, information identifying the communication resources of said set after providing, to said communication apparatus, said information identifying a respective measure of communication quality associated with each of said communication resources; and wherein said control circuitry is operable to identify the communication resources of said set based on said information identifying the communication resources of said set received from said communication apparatus.

4. A device according to claim 1 wherein said communication device is operable to signal information identifying the communication resources of said set to said communication apparatus.

5. A device according to claim 4 wherein said communication device is operable to signal said information identifying the communication resources of said set to said communication apparatus as part of said information identifying said measures of communication quality.

6. A device according to claim 1 wherein said set comprising a number of said communication resources in which to search for control information transmitted by said communication apparatus comprises a search space.

7. A device according to claim 1 wherein said control information transmitted by said communication apparatus is transmitted in the control channel, wherein the control channel is a physical downlink control channel (PDCCH) or enhanced physical downlink control channel (ePDCCH), and wherein said device is operable to locate said control channel by searching in said set of communication resources.

8. A device according to claim 7 wherein said control channel comprises at least one CCE.

9. A device according to claim 1 wherein said information identifying said measures of communication quality comprise at least one carrier quality indication (CQI) report.

10. A device according to claim 1 wherein said communication resources in which to search for control information are arranged in said set in order of decreasing quality based on said measures of communication quality.

11. A device according to claim 1 comprising a mobile telephone.

12. A communication apparatus for communicating with a plurality of mobile communication devices in a cellular communication system, said communication apparatus comprising:
  communication circuitry configured to communicate using a plurality of subframes with at least one mobile communication device within at least one cell, wherein each subframe comprises a plurality of communication resources and wherein the communication circuitry is further configured to receive, from said at least one mobile communication device, information identifying respective measures of communication quality associated with each of a plurality of communication resources; and
  control circuitry configured to:
    identify a set comprising a number of said communication resources for a control channel, formed using an aggregation of a plurality of control channel elements (CCEs), for use in potential transmission of control information for the at least one mobile communication device wherein the presence of communication resources in said set is based on said measures of communication quality, wherein said identifying comprises:
      identifying, in order of the communication quality represented by said obtained measures of communication quality, a set of sub-bands; and
      finding, in the identified set of sub-bands in said order of the communication quality, CCE candidates;
      wherein said CCE candidates are added to said set of communication resources until the set for a control channel attains a size required for said aggregation; and
    transmit control information for said at least one mobile communication device in at least a subset of said set of communication resources,
    wherein a search space for the control information is determined based on both an aggregation level of the CCEs making up the control channel for the control information and a total number of the CCEs in a system bandwidth.

13. Apparatus according to claim 12 wherein said control circuitry is operable to identify communication resources for inclusion in said set based on said information identifying a respective measure of communication quality associated with each of said communication resources received from the communication device.

14. Apparatus according to claim 12 wherein said communication apparatus is operable to receive, from said communication device and separately to said information identifying a respective measure of communication quality associated with each of said communication resources, information identifying the communication resources of said set; and wherein said control circuitry is operable to identify the communication resources of said set based on said information identifying the communication resources of said set received from said communication device.

15. Apparatus according to claim 12 wherein said communication apparatus is operable to signal information identifying the communication resources of said set to said communication device.

16. Apparatus according to claim 12 wherein said apparatus is operable to transmit said control information in a control channel (e.g. a physical downlink control channel (PDCCH) or enhanced physical downlink control channel (ePDCCH)) in said set of communication resources.

17. Apparatus according to claim 16 wherein said control channel comprises at least one CCE and wherein said apparatus is operable to transmit each said CCE using communication resources of said set.

18. Apparatus according to claim 12 comprising a base station.

19. A method performed by a communication device for communicating with a plurality of further communication devices in a cellular communication system, the method comprising:
  communicating, in at least one communication cell operated by communication apparatus of said communication system, using a plurality of subframes, wherein each subframe comprises a plurality of communication resources;
  obtaining respective measures of communication quality associated with each of a plurality of communication resources and providing information identifying said measures of communication quality to said communication apparatus;
  identifying a set comprising a number of said communication resources for a control channel, formed using an aggregation of a plurality of control channel elements (CCEs), in which to search for control information transmitted by said communication apparatus wherein the presence of communication resources in said set is based on said measures of communication quality, wherein said identifying comprises:
    identifying, in order of the communication quality represented by said obtained measures of communication quality, a set of sub-bands; and
    finding, in the identified set of sub-bands in said order of the communication quality, CCE candidates;
    wherein said CCE candidates are added to said set of communication resources until the set for a control channel attains a size required for said aggregation; and
  searching for control information in said set of communication resources
    wherein a search space for the control information is determined based on both an aggregation level of the CCEs making up the control channel for the control information and a total number of the CCEs in a system bandwidth.

20. A method performed by a communication apparatus for communicating with a plurality of mobile communication devices in a cellular communication system, the method comprising:
- operating at least one communication cell;
- communicating using a plurality of subframes with at least one mobile communication device within said at least one cell, wherein each subframe comprises a plurality of communication resources;
- receiving, from said at least one mobile communication device, information identifying respective measures of communication quality associated with each of a plurality of communication resources;
- identifying a set comprising a number of said communication resources for a control channel, formed using an aggregation of a plurality of control channel elements (CCEs), for use in potential transmission of control information for the at least one mobile communication device wherein the presence of communication resources in said set is based on said measures of communication quality, wherein said identifying comprises:
  - identifying, in order of the communication quality represented by said obtained measures of communication quality, a set of sub-bands; and
  - finding, in the identified set of sub-bands in said order of the communication quality, CCE candidates;
- wherein said CCE candidates are added to said set of communication resources until the set for a control channel attains a size required for said aggregation; and
- transmitting said CCE for said at least one mobile communication device in at least a subset of said set of communication resources;
- wherein a search space for the control information is determined based on both an aggregation level of the CCEs making up the control channel for the control information and a total number of the CCEs in a system bandwidth.

* * * * *